(12) United States Patent
Shimoyama et al.

(10) Patent No.: US 8,440,089 B2
(45) Date of Patent: May 14, 2013

(54) THREE-DIMENSIONAL STRUCTURE AND ITS MANUFACTURING METHOD

(75) Inventors: Isao Shimoyama, Tokyo (JP); Kiyoshi Matsumoto, Tokyo (JP); Kazunori Hoshino, Austin, TX (US); Kentaro Noda, Tokyo (JP); Shuji Hachitani, Osaka (JP); Hidehiro Yoshida, Osaka (JP); Shoichi Kobayashi, Hyogo (JP); Tohru Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 291 days.

(21) Appl. No.: 12/889,821

(22) Filed: Sep. 24, 2010

(65) Prior Publication Data

US 2011/0014741 A1 Jan. 20, 2011

Related U.S. Application Data

(62) Division of application No. 11/654,658, filed on Jan. 18, 2007, now Pat. No. 7,825,567.

(30) Foreign Application Priority Data

Jan. 20, 2006 (JP) ................................. 2006-012614

(51) Int. Cl.
*B81C 1/00* (2006.01)
(52) U.S. Cl.
USPC ........ 216/2; 216/13; 216/39; 216/56; 438/52; 438/106
(58) Field of Classification Search ........................ None
See application file for complete search history.

(56) References Cited

U.S. PATENT DOCUMENTS

| 6,969,945 | B2 | 11/2005 | Namba et al. |
| 7,545,014 | B2 * | 6/2009 | Wang et al. .................... 257/443 |
| 2005/0021247 | A1 * | 1/2005 | Liu et al. ......................... 702/42 |
| 2005/0159002 | A1 * | 7/2005 | Fork et al. ...................... 438/689 |
| 2005/0184623 | A1 | 8/2005 | Baur et al. |
| 2005/0262676 | A1 | 12/2005 | Kim et al. |
| 2006/0108652 | A1 | 5/2006 | Partridge et al. |

FOREIGN PATENT DOCUMENTS

| JP | 5-169567 | 7/1993 |
| JP | 2000-254884 | 9/2000 |
| JP | 2002-228677 | 8/2002 |
| JP | 3704558 | 10/2005 |
| JP | 2005-305607 | 11/2005 |
| JP | 2006-201061 | 8/2006 |
| JP | 2006-208248 | 8/2006 |

OTHER PUBLICATIONS

Kentaro Noda et al., "300nm-Thick Cantilevers in PDMS for Tactile Sensing", Proc. IEEE MEMS' 05, pp. 283-286, 2005.
Kentaro Noda et al., "Fabrication of the Flexible Sensor Using Soi Wafer by Removing the Thick Silicone Layer", Category 3, Fabrication and Packaging Technologies, Reference No. 0857, Jan. 22, 2006.

* cited by examiner

*Primary Examiner* — Anita Alanko
(74) *Attorney, Agent, or Firm* — Wenderoth, Lind & Ponack, L.L.P.

(57) ABSTRACT

A plurality of micro three-dimensional structure elements each having a movable structure fixed on a sacrifice layer, and fixation portions of the micro three-dimensional structure elements for the sacrifice layer are arranged into a film-like elastic body, and then the sacrifice layer is removed. Thus, a three-dimensional structure in which the individual micro three-dimensional structure elements are arranged independently of one another within the elastic body is manufactured.

13 Claims, 18 Drawing Sheets

THREE-DIMENSIONAL STRUCTURE AND ITS MANUFACTURING METHOD

CROSS REFERENCE TO RELATED APPLICATION

This application is a divisional of U.S. application Ser. No. 11/654,658, filed on Jan. 18, 2007 now U.S. Pat. No. 7,825,567, the entirety of which is incorporated herein by reference.

BACKGROUND OF THE INVENTION

1. Field of the Invention

The present invention relates to a structure, as well as its manufacturing method, formed three-dimensionally by using MEMS (Micro Electro Mechanical Systems) technology or NEMS (Nano Electro Mechanical Systems) technology. In particular, the invention relates to a three-dimensional structure, as well as its manufacturing method, in which micro three-dimensional structure elements having a movable structure are arranged in an elastic body.

2. Description of the Related Art

In the research and development of robot technology, it is one of important issues how an object is reliably controlled by a robot hand. More specifically, with respect to an operation of grasping an object by a robot hand, not only detecting grasping force to grasp the object therewith but also detecting a shearing stress occurring to the hand surface due to the grasping operation is needed for reliable control of robot hands. The reason of this is that detecting a frictional force generated between the object and the hand surface by the shearing stress lends it exerting optimum frictional-force control to fulfill reliable control of the object.

In recent years, tactile sensors aimed at detecting such shearing stress have been being developed. See, e.g., Kentaro Noda, Kazunori Hoshino, Kiyoshi Matsumoto, Isao Shimoyama, "300 nm-thick cantilevers in PDMS for tactile sensing", Proc. IEEE MEMS'05, pp. 283-286, 2005. An example of such conventional tactile sensors is explained below with reference to a schematic perspective view shown in FIG. 19.

As shown in FIG. 19, a tactile sensor 501 includes a plurality of piezoresistive cantilevers 502, which are cantilevers with piezoresistors on its hinges, formed from a thin film of about several hundred nanometers, one sheet of substrate member 503 on which those cantilevers 502 are fixed at its top face, and a film-like elastic body 504 which is placed inside the substrate member 503 so as to allow the cantilevers, which are fixed on the top face of the substrate member 503, to be embedded therein.

Each of the cantilevers 502 has one end formed as a fixation portion for the substrate member 503 and the other end formed as a movable portion which is movable only in a thicknesswise direction of the thin film that forms the cantilever 502. The individual cantilevers 502 are electrically connected to an unshown control unit through unshown terminal portions and wiring. For example, upon occurrence of a shearing stress in the film-like elastic body 504, the shearing stress causes the movable portion of the cantilever 502 to be activated and deformed, thus making possible to detect the shearing stress. In each of the cantilevers 502, a piezoresistive portion for detecting any deformation of the movable portion is formed. Further, in order to detect shearing stresses of various directions acting on the film-like elastic body 504, the cantilevers 502 are arranged within the film-like elastic body 504, as it is fixed on the substrate member 503, so that their movable portions are differed in movable direction, for example, that their movable directions are set along X-axis, Y-axis and Z-axis directions as shown in the figure.

With the tactile sensor 501 constructed as shown above, contact of the film-like elastic body 504 with an object or the like makes it possible to detect shearing stresses in various directions occurring within the film-like elastic body 504 by the cantilevers 502, respectively. It is noted that such a film-like elastic body 504 is formed from, for example, PDMS (polydimethylsiloxane), which is a material that is easily elastically deformed by application of external force. The substrate member 503 is given by using SOI wafer, which is formed of Si or $SiO_2$.

SUMMARY OF THE INVENTION

The tactile sensor 501 having such a conventional structure as described above is formed through the steps of two-dimensionally forming each cantilever 502 as a thin-film member on an SOI wafer that is to become the substrate member 503, then forming a cantilever structure by etching or other process, thereafter performing such processes as erecting the cantilever structure by using a magnetic field or other force or method, and finally making the cantilever structure embedded in the film-like elastic body 504 that is formed from PDMS. Accordingly, in the state that the structure is embedded within the film-like elastic body 504, the substrate member 503, to which the individual cantilevers 502 are fixedly placed, is inevitably present.

When such a tactile sensor 501 is set for use on a curved surface such as a surface of a robot hand, the presence of the substrate member 503, which is a hard material, gives limitations of the use such as the placement of the tactile sensor 501 on curved-surface portions.

Therefore, an object of the present invention, lying in solving these and other issues, is to provide a three-dimensional structure, as well as its manufacturing method, in which micro three-dimensional structure elements each having a movable structure formed by using the MEMS technology or NEMS technology are placed within a film-like elastic body, the three-dimensional structure being capable of effectively utilizing the flexibility of the film-like elastic body while the operation of the movable structure is improved in smoothness.

In accomplishing the above object, the present invention has the follow constitutions.

According to a first aspect of the present invention, there is provided a three-dimensional structure comprising:

a plurality of micro three-dimensional structure elements each having a movable structure; and a film-like elastic body in which said individual micro three-dimensional structure elements are arranged independently of one another.

According to a second aspect of the present invention, there is provided the three-dimensional structure as defined in the first aspect, wherein each of said micro three-dimensional structure elements has an external force detection function for detecting operation of the movable structure based on elastic deformation generated in said film-like elastic body by action of an external force.

According to a third aspect of the present invention, there is provided the three-dimensional structure as defined in the first aspect, wherein each of said micro three-dimensional structure elements has an external force transfer function for operating the movable structure to transfer an external force to its surrounding film-like elastic body so that said film-like elastic body is elastically deformed.

According to a fourth aspect of the present invention, there is provided the three-dimensional structure as defined in the first aspect, wherein each of said micro three-dimensional structure elements is arranged so that its whole outer periphery is covered with said film-like elastic body.

According to a fifth aspect of the present invention, there is provided the three-dimensional structure as defined in the first aspect, wherein each of said micro three-dimensional structure elements is so structured as to be movable in one movable direction, and said micro three-dimensional structure elements are so arranged independently of one another that the movable direction of one of said micro three-dimensional structure elements and the movable direction of another one of said micro three-dimensional structure elements are different from each other.

According to a sixth aspect of the present invention, there is provided a three-dimensional structure comprising:

a plurality of micro three-dimensional structure element groups in each of which a plurality of micro three-dimensional structure elements are coupled to one another by a coupling member, and a film-like elastic body in which said micro three-dimensional structure element groups are arranged independently of one another.

According to a seventh aspect of the present invention, there is provided the three-dimensional structure as defined in the sixth aspect, wherein in each of said micro three-dimensional structure element groups, the coupling member is formed from an elastic material having a modulus of elasticity higher than a modulus of elasticity of said film-like elastic body.

According to an eighth aspect of the present invention, there is provided a three-dimensional structure manufacturing method comprising:

arranging, into a film-like elastic body, a plurality of micro three-dimensional structure elements each having a movable structure fixed on a sacrifice layer, and fixation portions of said micro three-dimensional structure elements fixed to said sacrifice layers; and removing said sacrifice layers so that said micro three-dimensional structure elements are arranged independently of one another within said film-like elastic body.

According to a ninth aspect of the present invention, there is provided the three-dimensional structure manufacturing method as defined in the eighth aspect, wherein the arrangement of said individual micro three-dimensional structure elements into said film-like elastic body is fulfilled by arranging a plurality of micro three-dimensional structure element groups, in each of which said plurality of micro three-dimensional structure elements are coupled to one another by a coupling member, and said individual fixation portions of said sacrifice layers, at which said individual micro three-dimensional structure element groups are fixed to said sacrifice layers, into said film-like elastic body, and then said sacrifice layers are removed, by which said individual micro three-dimensional structure element groups are arranged independently of one another into said film-like elastic body.

According to a tenth aspect of the present invention, there is provided the three-dimensional structure manufacturing method as defined in the eighth aspect, further comprising:

after the removal of the sacrifice layers, placing an elastic body, which is formed from the same material as that of said film-like elastic body, at portions of said film-like elastic body where said sacrifice layers have been removed.

According to an eleventh aspect of the present invention, there is provided the three-dimensional structure manufacturing method as defined in the eighth aspect, wherein said individual micro three-dimensional structure elements are arranged into said film-like elastic body so that at least parts of said sacrifice layers are exposed from a surface of said film-like elastic body.

According to a twelfth aspect of the present invention, there is provided the three-dimensional structure manufacturing method as defined in the eighth aspect, wherein the arrangement of said individual micro three-dimensional structure elements into said film-like elastic body is fulfilled by arranging, into said film-like elastic body that is in a fluidizable state, said individual micro three-dimensional structure elements and said fixation portions to said sacrifice layers, and then curing the elastic body in the resulting arrangement state.

According to a thirteenth aspect of the present invention, there is provided the three-dimensional structure manufacturing method as defined in the eighth aspect, wherein said sacrifice layers are formed of Si or $SiO_2$.

According to a fourteenth aspect of the present invention, there is provided the three-dimensional structure manufacturing method as defined in the eighth aspect, wherein said individual micro three-dimensional structure elements formed on said sacrifice layer having a curved-surface configuration or a multifaceted-surface configuration are arranged into said film-like elastic body having a curved-surface configuration or a multifaceted-surface configuration.

According to a fifteenth aspect of the present invention, there is provided the three-dimensional structure manufacturing method as defined in the eighth aspect, further comprising:

after the removal of the sacrifice layers, placing a flexible substrate formed from an elastic material on a surface of said film-like elastic body on one side on which said sacrifice layers have been removed.

According to a sixteenth aspect of the present invention, there is provided the three-dimensional structure manufacturing method as defined in the tenth aspect, further comprising:

after the placement of the elastic body at the removal portions of the sacrifice layer, placing a flexible substrate formed from an elastic material on a surface of said film-like elastic body on one side thereof on which said elastic body has been placed.

According to the present invention, the three-dimensional structure is manufactured by the steps of setting a plurality of micro three-dimensional structure elements, which are formed on a relatively hard sacrifice layer of Si or $SiO_2$ or the like, into a placement within a film-like elastic body, and thereafter removing the sacrifice layer. Therefore, in this three-dimensional structure, the individual micro three-dimensional structure elements can be set so as to be arranged physically independently of one another. In such a structure, external force applied to the film-like elastic body can be transferred independently and securely to the individual micro three-dimensional structure elements without impairing the flexibility of the film-like elastic body, or force can securely be transferred from the individual micro three-dimensional structure elements to their peripheral film-like elastic body. Thus, there can be provided a three-dimensional structure capable of effectively utilizing the functions of the film-like elastic body having flexibility.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
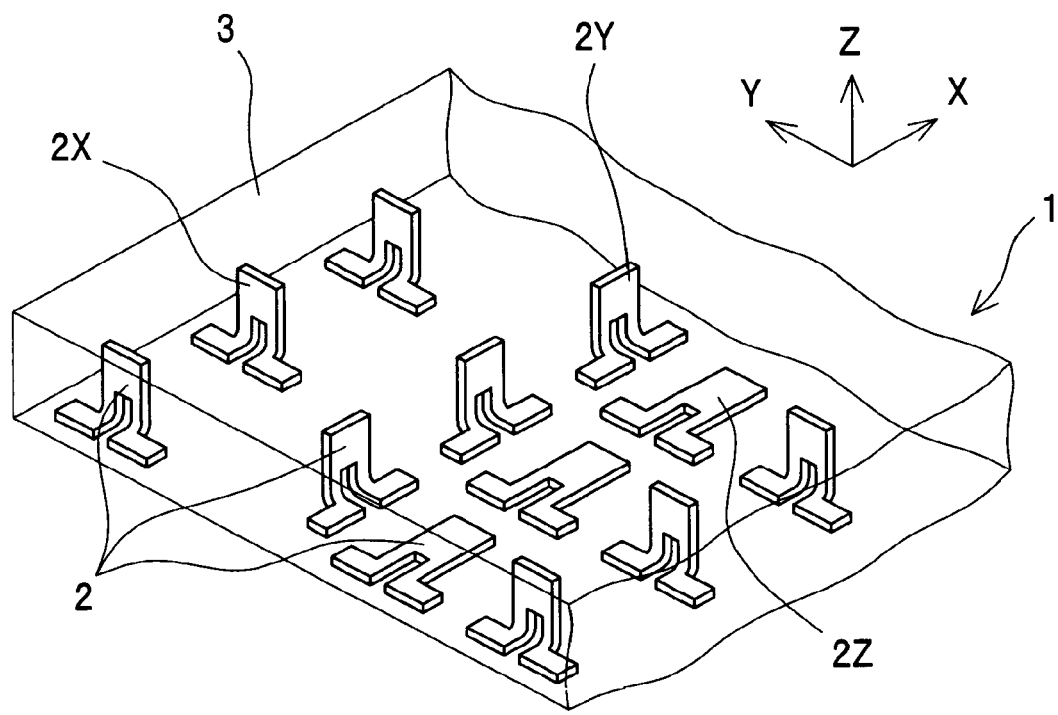
FIG. 1 is a schematic perspective view showing a construction of a tactile sensor according to a first embodiment of the present invention.

Before the description of the present invention proceeds, it is to be noted that like parts are designated by like reference numerals throughout the accompanying drawings.

Hereinbelow, embodiments of the present invention will be described in detail with reference to the accompanying drawings.

First Embodiment

FIG. 1 is a schematic perspective view showing a schematic structure of a tactile sensor 1 (or tactile sensor structure 1) which is an example of a three-dimensional structure according to a first embodiment of the present invention.

As shown in FIG. 1, the tactile sensor 1 of the first embodiment has a construction that a plurality of cantilevers 2, which are an example of the micro three-dimensional structure element having a movable structure, are arranged independently of one another within a film-like elastic body 3. That is, in this construction, the individual cantilevers 2 are embedded in the film-like elastic body 3, with their whole peripheries covered with the film-like elastic body 3, without being coupled to one another by any other member such as a substrate member.

Figure 2:
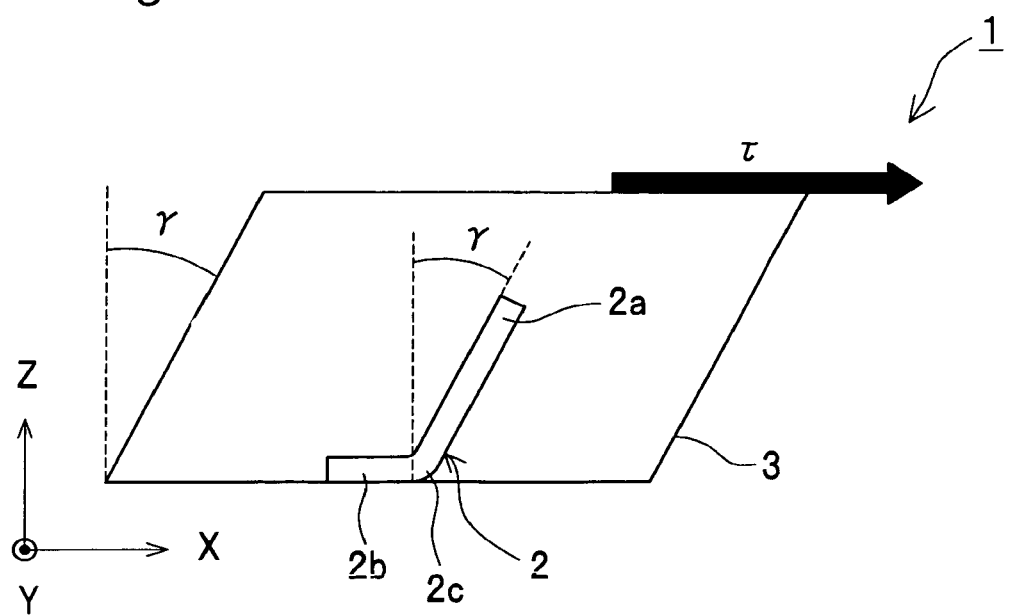
FIG. 2 is a schematic explanatory view for explaining an external force detection function of the tactile sensor of FIG. 1.

As shown in FIG. 2, which is a schematic explanatory view of the tactile sensor 1, each of the cantilevers 2 is formed into a thin film shape having a thickness of, for example, about several hundred nanometers, so as to have a movable structure with one end (fixed end) given by a fixation portion 2b and the other end (free end) given by a movable portion 2a, i.e., a cantilever structure. The cantilever 2 is so formed that its thickness becomes thin enough with respect to its widthwise direction, thus the movable portion 2a being movable in the thicknesswise direction with respect to the fixation portion 2b. Further, each cantilever 2 has a hinge portion 2c which is an example of a connecting portion that connects the movable portion 2a and the fixation portion 2b to each other so that deformation of the connecting portion causes the movable portion 2a to operate. In this hinge portion 2c, a piezoresistive portion for electrically detecting an operating angle of the movable portion 2a is provided.

Also, as shown in FIG. 1, the tactile sensor 1 includes three types of cantilevers 2 that differ in the movable direction of their movable portions 2a from one another, for example, an X-axis direction cantilever 2X having a movable direction along the X-axis direction in the figure, a Y-axis direction cantilever 2Y having a movable direction along a Y-axis direction in the figure, and a Z-axis direction cantilever 2Z having a movable direction along a Z-axis direction in the figure. In FIG. 1, the X-axis direction and the Y-axis direction are directions which extend along the surface of the film-like elastic body 3 and which are orthogonal to each other, and the Z-axis direction is a direction which is orthogonal to the X-axis and Y-axis directions.

The film-like elastic body 3 is formed from an elastic material which is elastically deformed by application of external force or the like and which has such flexibility that the elastic deformation causes the movable portion 2a of the cantilever 2 to be operated (deformed). As such an elastic material, transparent or colored PDMS (polydimethylsiloxane) as an example is used. Also, the film-like elastic body 3 has another function of protecting the individual cantilevers 2 from being damaged by direct contact with external objects or the like, and therefore is formed into such a thickness as to cover the entirety of each cantilever 2, e.g., a thickness of about 1 to 2 mm or less. In order that both flexibility and strength can be satisfied at the same time while a later-described stress detection function of the cantilevers 2 is effectively achieved, it is more desirable that the film-like elastic body 3 be formed into a thickness of, for example, about 100 µm to 1 mm.

Moreover, although not shown in FIG. 1, a terminal portion is provided at the fixation portion 2b in each cantilever 2. The terminal portions are independently connected with wiring for electrical connection to the control unit so that the operating angle of the movable portion 2a in each cantilever 2 can be detected electrically.

For the tactile sensor 1 having the construction shown above, a shearing stress or pressure generated inside the film-like elastic body 3 by application of external force to the film-like elastic body 3 can be detected by operation and deformation of the movable portion 2a of the cantilever 2 whose movable direction coincides with the direction in which the stress is generated. It is noted that the X-axis direction cantilever 2x and the Y-axis direction cantilever 2Y in FIG. 1 function as sensors for detecting forces that are generated along the surface of the film-like elastic body 3, while the Z-axis direction cantilever 2Z functions as a sensor for detecting forces, or pressures, that are generated in the Z-axis direction in the film-like elastic body 3.

Here is given an explanation of the principle in which stress is detected by such a cantilever 2 with reference to the schematic explanatory view of the tactile sensor 1 shown in FIG. 2.

Figure 22:
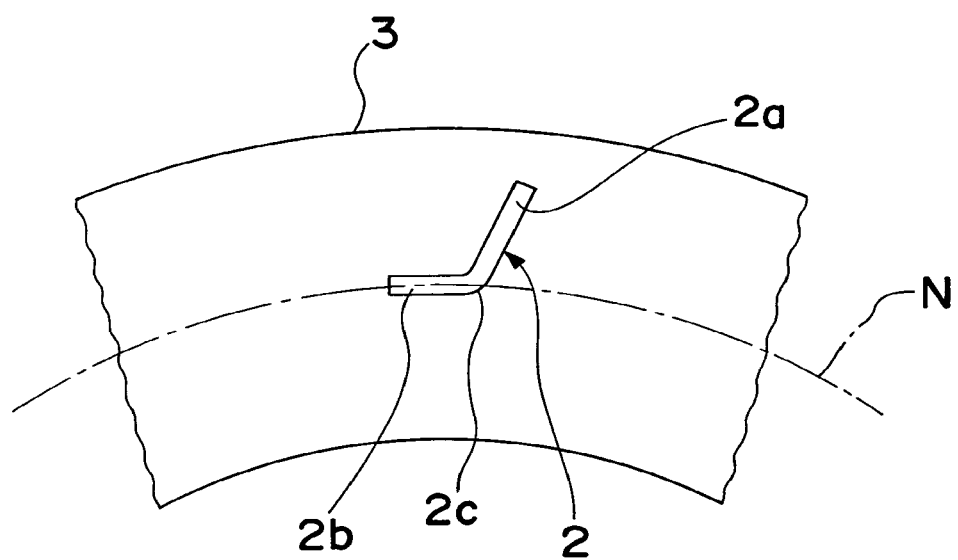
FIG. 22 is a schematic view showing a state that the cantilever of FIG. 1 is placed on a neutral axis of a film-like elastic body.

As shown in FIG. 2, in the tactile sensor 1, upon application of an external force that acts along the surface of the film-like elastic body 3, a shearing stress τ is generated in the horizontal direction, causing the film-like elastic body 3 to be elastically deformed, so that a shearing strain γ is generated in the horizontal direction. As a result, the cantilever 2 arranged within the film-like elastic body 3, the movable portion 2a of which is distorted integrally with the film-like elastic body 3, is deformed to an extent corresponding to the shearing strain γ, i.e. elastically deformed, in its movable direction (e.g., in the X-axis direction of the figure). Since such a shearing strain γ does not vary depending on the position of the film-like elastic body 3 in its thicknesswise direction but is kept uniform generally, so that the deforming extent of the movable portion 2a does not change depending on the placement position of the cantilever 2 in the film-thickness direction within the film-like elastic body 3. From such a point of view, the placement position of the cantilever 2 in the film-thickness direction can be set freely. However, taking into consideration that the film-like elastic body 3 itself is curved so as to be used in a curved-surface configuration, the cantilever 2 is preferably placed on a neutral axis N in the film-thickness direction that involves the least effects of the curve as shown in the schematic view of FIG. 22, and preferably placed, for example, so that the fixation portion 2b of the cantilever is positioned on the neutral axis N. Further, such placement on the neutral axis N allows the cantilever 2 to be reliably protected.

Meanwhile, the hinge portion 2c of the cantilever 2 includes a piezoresistive portion. This piezoresistive portion has a function that its electrical resistance value varies relative to the deformation amount of the movable portion 2a, while correlations between such deformation amounts and resistance values are previously measured and inputted and stored as correlation data in the aforementioned unshown control unit. Accordingly, detecting a resistance change of the piezoresistive portion due to a deforming extent of the cantilever 2 effectuated by the shearing strain γ caused in the film-like elastic body 3 by the shearing stress τ allows the shearing stress τ generated in the film-like elastic body 3 by an external-force action to be detected. In addition, according to such a principle of stress detection by detection of deforming extents of the movable portion 2a, the raised angle of the movable portion in the X-axis direction cantilever 2X and the Y-axis direction cantilever 2Y for detecting forces acting along the surface of the film-like elastic body 3 is preferably set to 90 degrees, while the raised angle of the movable portion in the Z-axis direction cantilever 2Z for detecting pressures is preferably set to 0 degrees.

Next, a manufacturing method for the tactile sensor 1 having such functions shown above is explained below with reference to the accompanying drawings. In the following description, the manufacturing method for the cantilevers 2 is first described with reference to FIGS. 3A to 3D, which are schematic sectional views of only one cantilever 2.

Figure 3A:
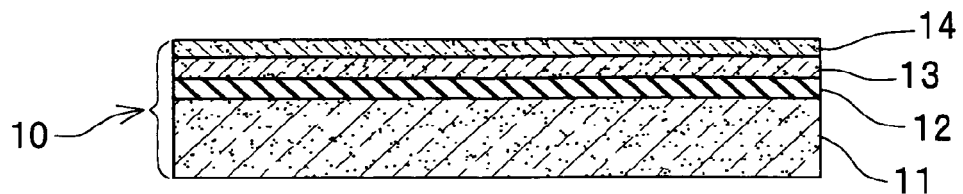
FIG. 3A is a schematic sectional view for explaining a manufacturing method of the cantilever included in the tactile sensor of FIG. 1, showing a state that a piezoresistive layer is formed on an SOI wafer.

First, as shown in FIG. 3A, with use of, for example, an SOI wafer 10 composed of a 300 µm thick Si lower-layer 11, a 400 nm thick $SiO_2$ layer 12 and a 290 nm thick Si upper-layer 13, an upper 100 nm portion in the Si upper-layer 13 is formed as a piezoresistive layer (portion) 14 by using, for example, a rapid thermal diffusion method.

Figure 3B:
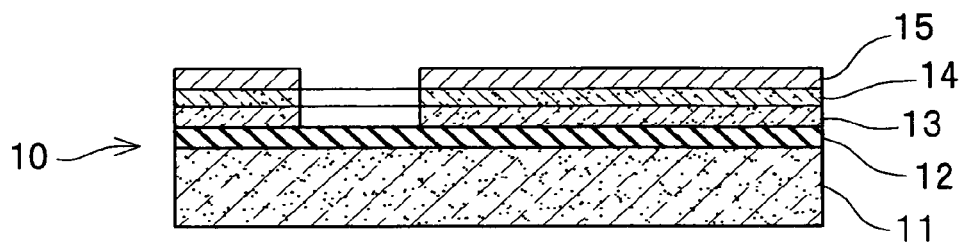
FIG. 3B is a schematic explanatory view for explaining the cantilever manufacturing method, showing a state that a Cr/Ni layer has been formed.

Further thereon, a Cr/Ni layer 15 is formed by sputtering and then patterned into a specified configuration. As shown in FIG. 3B, with the Cr/Ni layer 15 used as a mask, the piezoresistive layer 14 and the Si upper-layer 13 are etched by DRIE (Deep Reactive Ion Etching) process.

Figure 3C:
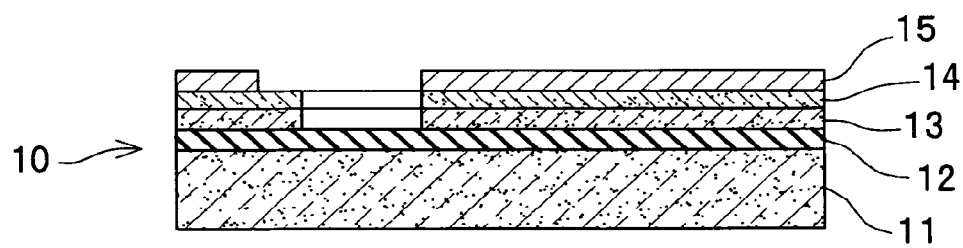
FIG. 3C is a schematic explanatory view for explaining the cantilever manufacturing method, showing a state that the Cr/Ni layer has been partly removed.

Thereafter, as shown in FIG. 3C, for prevention of short-circuits of the piezoresistive layer 14, the Cr/Ni layer 15, which is provided so as to cover a portion of the cantilever 2 corresponding to the hinge portion that connects the fixation portion 2b and the movable portion 2a to each other, is removed by etching.

Figure 3D:
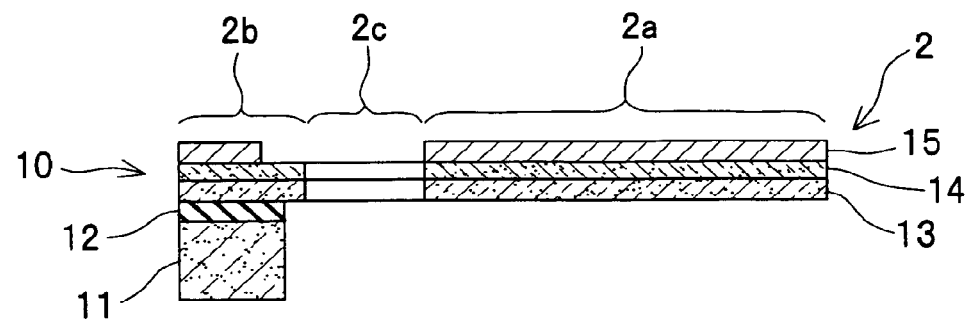
FIG. 3D is a schematic explanatory view for explaining the cantilever manufacturing method, showing a state that a basic structure of the cantilever has been completed.

Further thereafter, as shown in FIG. 3D, the Si lower-layer 11 is etched by DRIE process from the rear face side of the SOI wafer 10, and moreover the $SiO_2$ layer is etched by using HF (hydrofluoric acid) gas. Thus, a structural portion in the cantilever 2, which forms the movable portion 2a, i.e. a free end, is made open from the Si lower-layer 11 and the $SiO_2$ layer. Thus, the basic structure as the cantilever 2 is completed.

Figure 4:
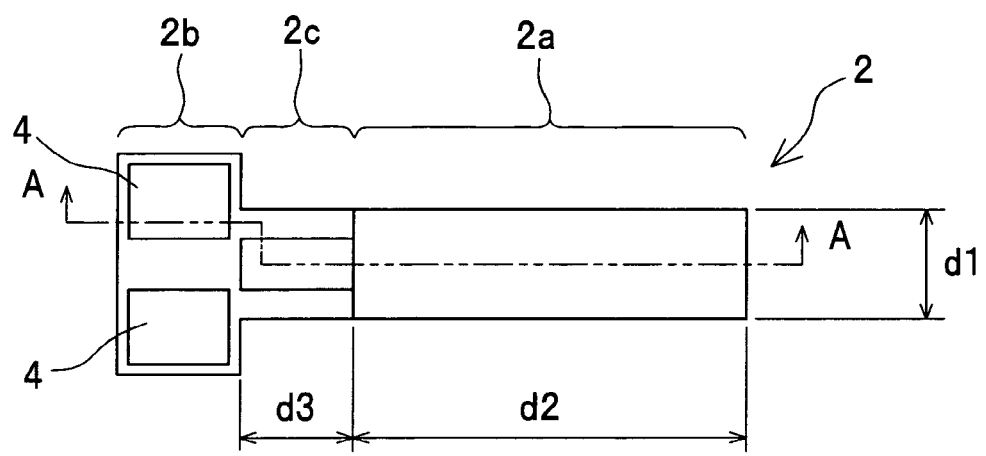
FIG. 4 is a schematic top view of the cantilever of FIG. 3D.

FIG. 4 shows a schematic top view of the cantilever 2 shown in FIG. 3D. As shown in FIG. 4, the cantilever 2 is formed into such dimensions, for example, that a width d1 of its movable portion 2a is 110 µm, a length d2 of a portion of the movable portion 2a over which the Cr/Ni layer 15 is formed is 300 µm, and a length d3 of the hinge portion 2c between the movable portion 2a and the fixation portion 2b is 150 µm, where the overall length of the cantilever 2 is 450 µm and its overall width is 150 µm. Also, a thickness of the piezoresistive layer 14 is 100 nm and a thickness of the Cr/Ni layer 15 is 5 nm/150 nm. Further, as shown in FIG. 4, a terminal portion 4 for delivery of electric signals with the external is formed at the fixation portion 2b of the cantilever 2. Furthermore, at the hinge portion 2c between the movable portion 2a and the fixation portion 2b, a hollow portion is provided as viewed in a plan view in the figure. In addition, a schematic sectional view showing a cross section by line A-A in FIG. 4 is shown in FIG. 3D. By the hinge portion 2c being divided into two structural bodies so that the hollow portion can be provided as shown above, inclinations or other outputs given to the structural bodies, respectively, are canceled out with outputs of their respective outputs of piezoresistive layers, thus making it possible to accurately detect an amount of deformation in only one direction in the cantilever 2. It is noted that the structural bodies in such a hinge portion 2c are each formed into a width of, for example, 30 μm. It is noted here that the term "micro" in the micro three-dimensional structure element herein refers to, for example, such a size of the three-dimensional structure element that even if a plurality of three-dimensional structure elements (i.e., cantilevers 2) are arranged within the film-like elastic body 3 formed at a thickness of about 100 μm to 1 mm, there hardly occurs any substantial effect on the flexibility of the film-like elastic body 3, where an example of the size of the three-dimensional structure element is several hundred μm or less. Desirably, the cantilever 2 like this is formed into even smaller sizes less than several hundred μm, according to the thickness size of the film-like elastic body 3, such that no substantial effect is given to its flexibility.

Next, a method for manufacturing the tactile sensor 1 by placing those cantilevers 2 formed on the SOI wafer 10 as described above within the film-like elastic body 3 is explained concretely. The following description is given, for an easier understanding thereof, on a case where two cantilevers 2 as an example are formed on the SOI wafer 10 and these two cantilevers 2 are arranged within the film-like elastic body 3. A flowchart showing the procedure of the manufacturing method is shown in FIG. 5, and schematic sectional views for explaining the individual steps are further shown in FIGS. 6 to 10.

Figure 5:
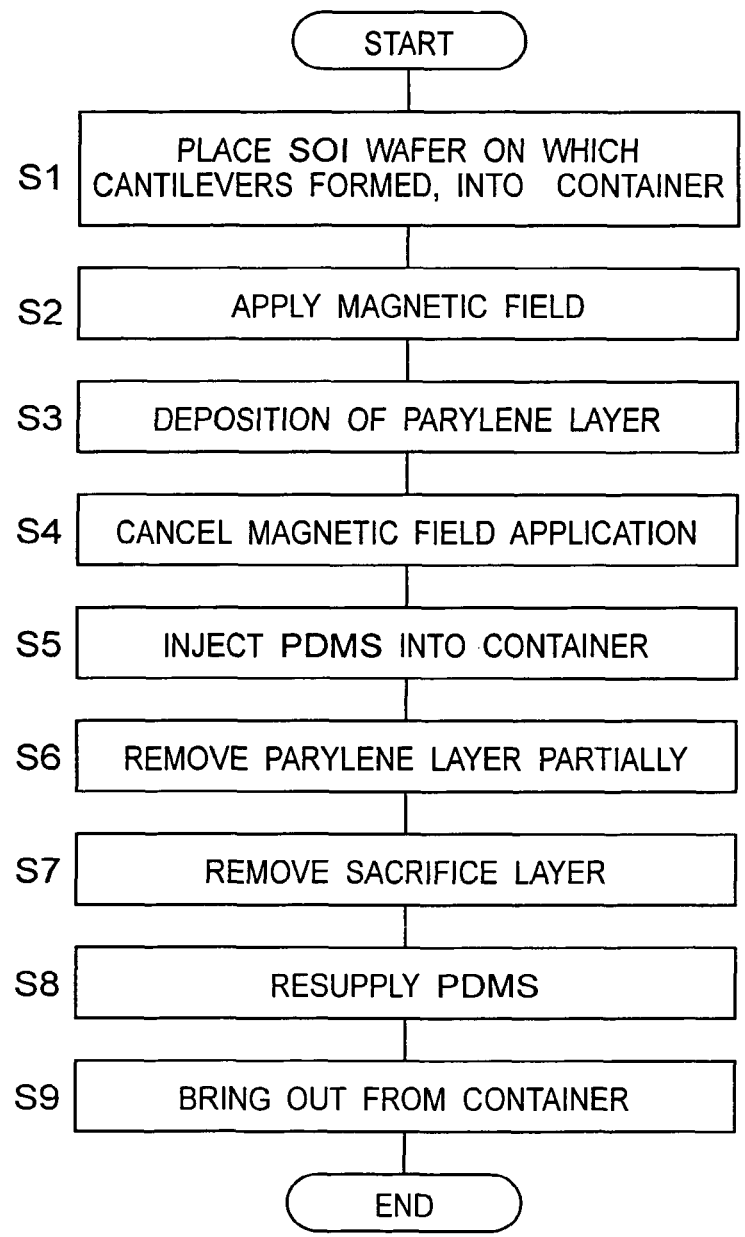
FIG. 5 is a flowchart showing the procedure in the manufacturing method of the tactile sensor of FIG. 1.
Figure 6:
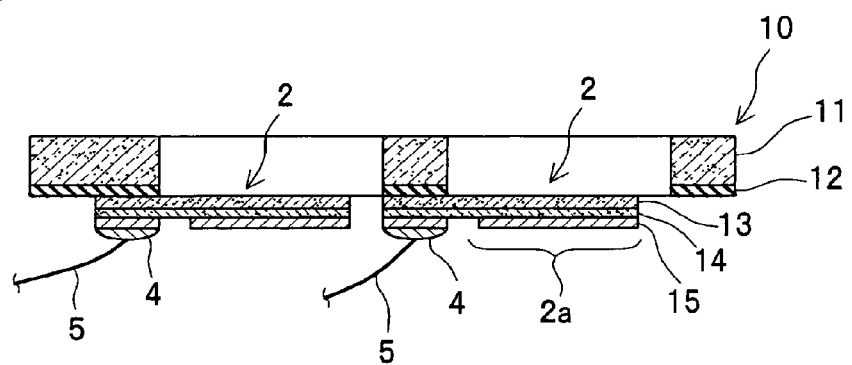
FIG. 6 is a schematic sectional view for explaining the manufacturing method of the tactile sensor, showing an SOI wafer on which cantilevers are formed.

First, as shown in the schematic sectional view of FIG. 6, two cantilevers 2 are formed on the SOI wafer 10, where a wiring line 5 is connected to the terminal portion 4 of each cantilever 2. Such an SOI wafer 10 is placed within a container 17 as it is supported by a spacer 16 formed of PDMS, which is an example of elastic material (step S1 in the flowchart of FIG. 5). In this case, the spacer 16 needs to have a height larger than the length of the movable portion 2a of the cantilever 2, the spacer 16 being, for example, 0.8 mm high. Also, the position at which the SOI wafer 10 is supported by each spacer 16 is set to such a position as to prevent interference due to operation of the movable portion 2a of each cantilever 2, as will be described later.

Figure 7:
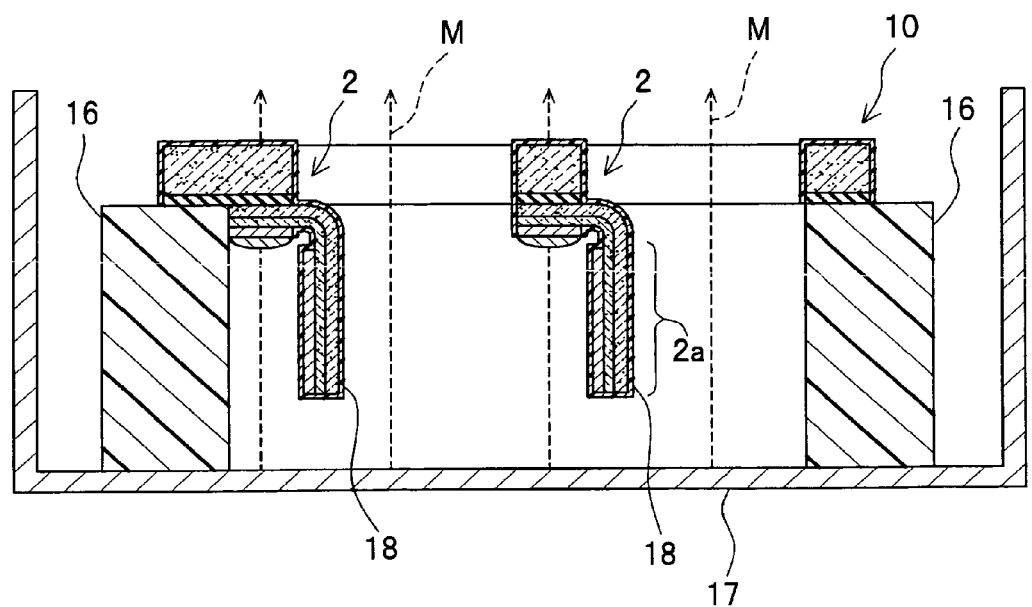
FIG. 7 is a schematic sectional view for explaining the manufacturing method of the tactile sensor, showing a state that the SOI wafer is placed within a container with magnetic fields imparted thereto.

Then, at step S2 of FIG. 5, a magnetic field M is imparted to the space in the container 17. By the magnetic field acting on the Cr/Ni layer 15 formed at the movable portion 2a of the cantilever 2 as shown above, for example, there occurs torque that presses each movable portion 2a downward in the figure, so that each movable portion 2a is deformed down so as to be positioned generally vertically as shown in FIG. 7. As such a magnetic field M, a magnetic field having strength of, for example, 350 mT is imparted.

In the state that the magnetic field M is imparted as shown above, parylene-C is deposited on the surface of the cantilever 2 as a posture-retaining and strength-reinforcing member, by which a parylene layer 18 is formed all over the surface of the cantilever 2 (step S3). Such a parylene layer 18 has a function of retaining the deformational posture of the cantilever 2 as well as the function of reinforcing the strength of the cantilever 2. Therefore, even if the impartment of the magnetic field M into the space inside the container 17 is canceled afterwards (step S4), the cantilever 2 is maintained in a state that the movable portion 2a is positioned generally vertically downward, and further the cantilever 2 can be protected from deformation or damage or the like due to external force in the following manufacturing steps. It is noted that the posture-retaining and strength-reinforcing member may be given by using a nonconductive film that can be deposited by vacuum deposition process. As such a nonconductive film, for example, parylene-C or parylene-N or the like may be used.

Figure 8:
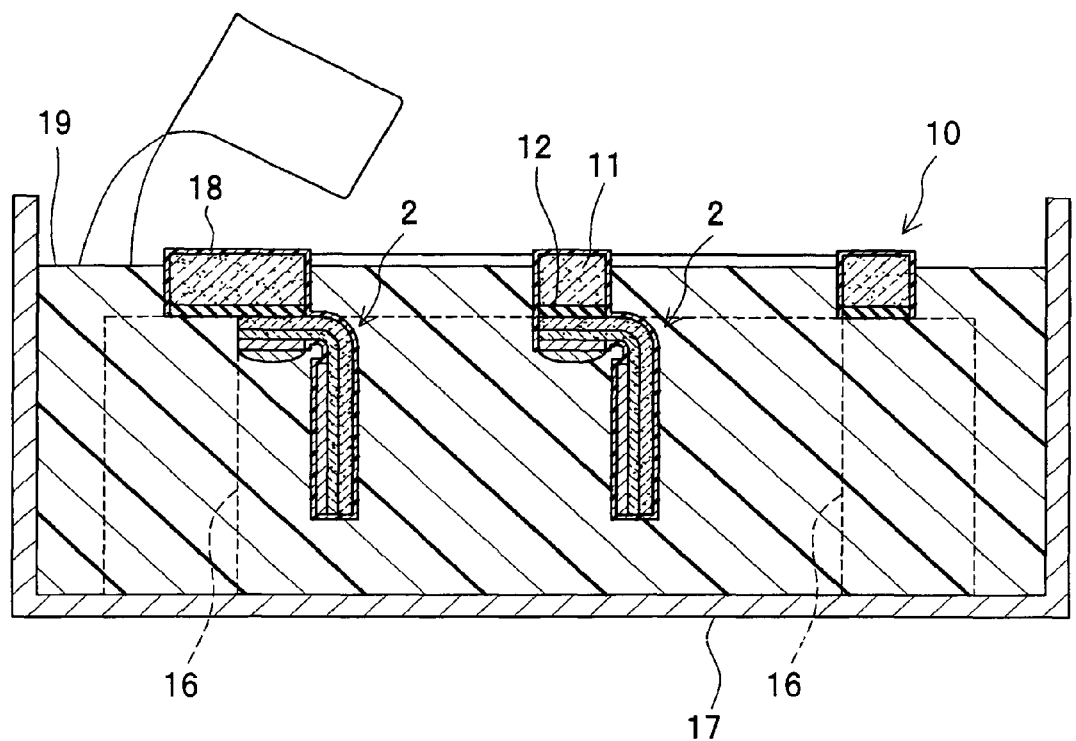
FIG. 8 is a schematic sectional view for explaining the manufacturing method of the tactile sensor, showing a state that PDMS is being injected into the container.

Next, as shown in FIG. 8, PDMS 19, which is a fluidized elastic material, is injected into the container (step S5). The injection of PDMS 19 is performed in such a manner that at least the individual cantilevers 2 and fixing portions of the SOI wafer 10 for the cantilevers 2 are immersed and embedded in the injected PDMS 19. Desirably, the injection is performed so that the top face of the SOI wafer 10 in the figure is exposed from the injected PDMS 19. In addition, control for the injection plane of the PDMS 19 in the container 17 (control for its height position) is executed by controlling the embedded volume of the container 17 and the cantilevers 2 and by controlling the injection amount of the PDMS 19. It is noted that the impartment of the magnetic field in step S4 may also be executed subsequent to the foregoing step S5.

Thereafter, as the PDMS 19 injected into the container 17 is cured, the parylene layer 18 deposited on the surface of the SOI wafer 10 exposed from the PDMS 19 is partly removed (step S6). The partial removal of the parylene layer 18 like this is executed by, for example, $O_2$ plasma etching process.

Figure 9:
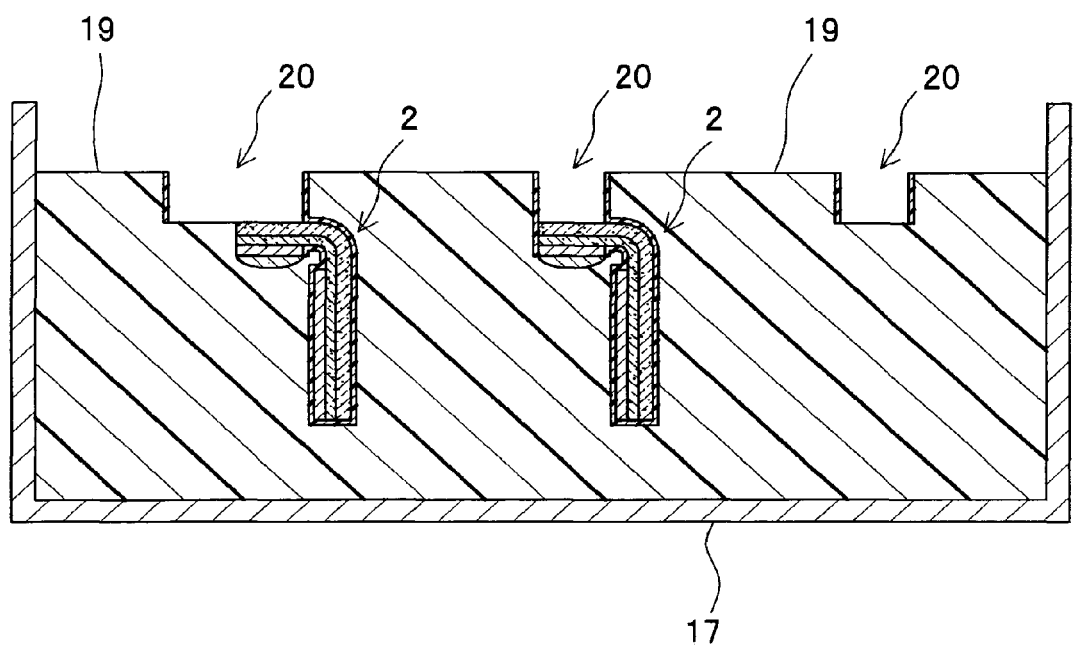
FIG. 9 is a schematic sectional view for explaining the manufacturing method of the tactile sensor, showing a state that a Si lower-layer and a SiO$_2$ layer have been removed.

Next, DRIE etching process is performed from the top face of the container 17, by which the Si lower-layer 11 of the SOI wafer 10 exposed from the PDMS 19 is removed. Thereafter, by executing etching process using hydrofluoric acid (HF) gas, the $SiO_2$ layer 12 exposed as a result of the removal of the Si lower-layer 11 is removed (step S7). As a result, as shown in FIG. 9, fixing portions of the individual cantilevers 2 for the SOI wafer 10 are removed, resulting in a state that respective recessed portions 20 are formed on the surface of the PDMS 19. Accordingly, by the removal of the $SiO_2$ layer 12 and the Si lower-layer 11 that have fixed the cantilevers 2, the individual cantilevers 2 are arranged independently of each other in the PDMS 19. That is, in this manufacturing method, the $SiO_2$ layer 12 and the Si lower-layer 11 in the SOI wafer 10 are layers which play the role as sacrifice layers that are to be finally removed. In addition, the removal of such sacrifice layers may also be done by $XeF_2$ gas etching, other than DRIE etching.

Figure 10:
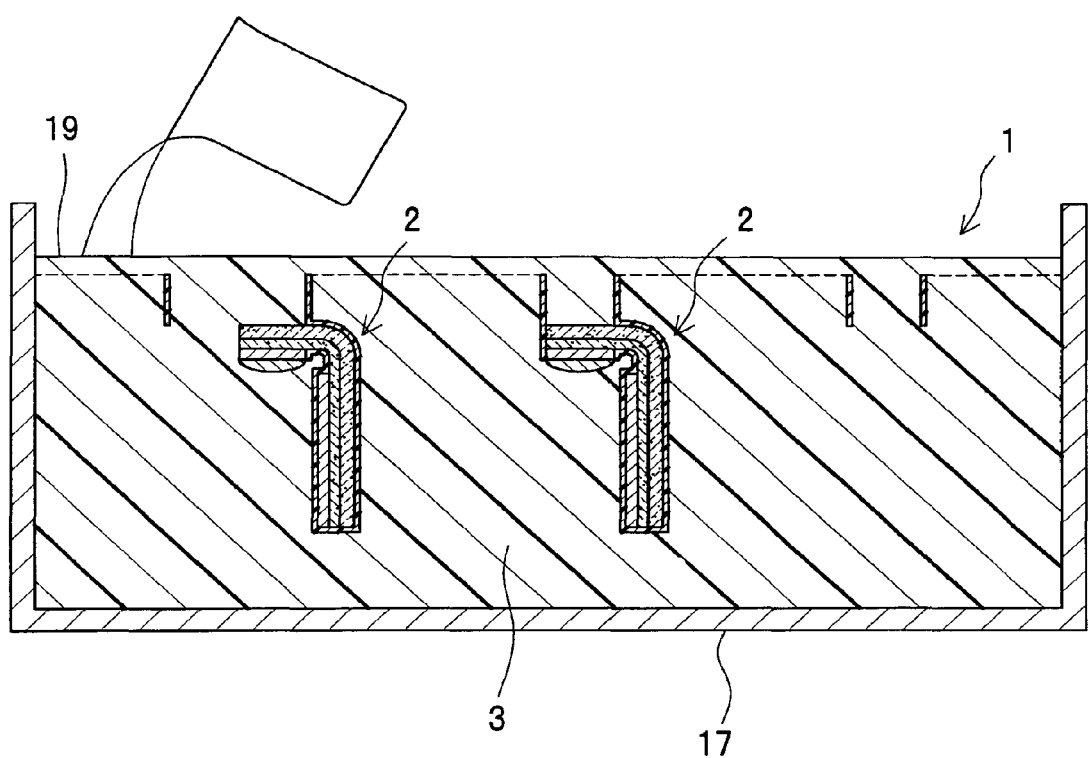
FIG. 10 is a schematic sectional view for explaining the manufacturing method of the tactile sensor, showing a state that PDMS is being resupplied into recessed portions.

Thereafter, as shown in FIG. 10, fluidized PDMS is injected into the individual recessed portions 20 formed on the surface of the PDMS 19, by which the PDMS 19 is resupplied (step S8). After this resupply, the injected PDMS 19 is cured, by which a film-like elastic body 3 formed of PDMS is formed. It is noted that such a film-like elastic body 3 is formed into a thickness of, for example, 2 mm. Subsequently, the film-like elastic body 3 is taken out from the container 17 (step S9), by which a tactile sensor 1 having a structure that a plurality of cantilevers 2 are arranged independently of one another in the film-like elastic body 3 is completed. It is noted that the term, "arranged independently," herein refers to a state that adjacent two cantilevers 2 are placed so as to be physically separated from each other, where those cantilevers 2 are arranged separately from each other so that, at least, one of the cantilevers 2 does not give a direct effect on the other cantilever 2.

The elastic material to be used for the injection to the individual recessed portions 20 is preferably the same as the PDMS 19, which has been the precedently injected elastic material. However, different elastic materials may also be used if the elasticity of the film-like elastic body 3, which is formed integrally therewith, is not affected. Such a concept is applicable also to the material of the spacer 16 in common.

The above description on the manufacturing method has been made on a case where each cantilever 2 is embedded within the film-like elastic body 3 by injection of the fluidized PDMS 19 into the container 17. However, the manufacturing method of the first embodiment is not limited only to such cases. Instead, for example, the individual cantilevers 2 may also be embedded into PDMS by means of transferring PDMS to the SOI wafer 10 on which the individual cantilevers 2 have been formed. Also, after the cantilevers are individualized and cut into pieces from the SOI wafer 10 on which the individual cantilevers 2 have been formed, those cantilevers may be embedded in the film-like elastic body at a desired pitch. Using such a technique allows the pitch in the manufacture of cantilevers and the pitch in the embedding of the cantilevers to be different from each other, hence an effective technique particularly when the embedding pitch is made wider than the manufacturing pitch.

Also, the above description has been made on a case where magnetic fields are applied collectively to the individual cantilevers 2 formed on the SOI wafer 10 and thereafter the parylene layer 18 is formed so that the posture of the cantilevers 2 is retained. However, the impartment of the magnetic field and the retention of the posture may also be fulfilled individually for the cantilevers 2. Also, in the cantilevers 2, the impartment of the magnetic field may be suppressed for those cantilevers whose movable portions 2a do not need to be changed in posture, such as the Z-axis direction cantilever 2Z. Further, cantilevers whose movable portions 2a do not need to be changed in posture may be structured without providing the Cr/Ni layer itself. This is because adopting such a structure eliminates the need for individual control for impartment/non-impartment of the magnetic field. Furthermore, the deformed angle, i.e. raised angle, may also be adjusted depending on the area of the coverage with a magnetic material (Cr/Ni layer 15). Such a method makes it practicable to optimize the sensor angle or the like according to the use or purpose. In addition, the raised angle can be adjusted not only by the area but also by the position where the magnetic material is formed, such as a forward end or center of the cantilevers.

The above description has been given with the tactile sensor 1 taken as an example of the three-dimensional structure. However, the three-dimensional structure of the present invention is not limited only to such tactile sensors. The three-dimensional structure has only to be so structured that a plurality of micro three-dimensional structure elements typified by cantilevers 2 formed with a substrate of a relatively hard material such as Si or SiO$_2$ used as the sacrifice layer by MEMS or NEMS technology or the like are arranged within a film-like elastic body, and thereafter the sacrifice layer is removed so that the individual micro three-dimensional structure elements are arranged independently of one another within the film-like elastic body. The three-dimensional structure, only if it has such a structure as shown above, can be manufactured by applying the manufacturing method of the first embodiment.

Such a micro three-dimensional structure element as shown above is a structure element which has a movable structure that at least part of the structure is movable, and that the structure element, as it is placed within the film-like elastic body, is movable by action of external force along with its surrounding elastic body. However, when the three-dimensional structure formed with such micro three-dimensional structure elements are embedded in the film-like elastic body is applied for uses without limitations to sensors or the like for detecting deformation of the movable portion (movable structure), e.g., for such use as deformation of the movable portion is not involved as in the cases of integrated circuits and photosensors or the like, each of the micro three-dimensional structure elements may be one having no movable structure, in which case the three-dimensional structure can be manufactured by applying the manufacturing method of the present invention.

Further, the micro three-dimensional structure element is preferably has an external force detection function of detecting an operation (deformation) of the movable structure based on elastic deformation (e.g., shearing stress) caused in the elastic body by the action of external force on the three-dimensional structure. Instead, the micro three-dimensional structure element may have an external force transfer function that the movable structure is operated (deformed) to make external force transferred to its surrounding elastic body so that the elastic body is elastically deformed. The external force detection function is typified by a function as a tactile sensor in the case of, for example, a cantilever, while the external force transfer function is a function that the film-like elastic body is partly elastically deformed by operating the cantilever at an actuator. Thus, if the micro three-dimensional structure element has the external force detection function or external force transfer function, it becomes possible to individually and reliably fulfill the function in a state that the micro three-dimensional structure elements are embedded within the film-like elastic body independently of one another. In addition, the piezoresistive layer (portion) in the cantilever may serve as an external force detector portion having such a function. Further, the cantilever may be set so as to serve as an external force transfer portion. The functioning of the cantilever as the external force transfer portion can be fulfilled by additionally providing a mechanism for operating the movable portion, e.g. a piezoelectric element, or by operating the movable portion with a magnetic field applied thereto by magnetic anisotropy. It is also possible that the cantilever is provided with both the external force detection function and external force transfer function so that upon reception of external force by the external force detection function, information is transferred by the external force transfer function.

The three-dimensional structure is applicable not only for sensors or actuators as shown above, but also for integrated circuits, displays (organic EL) and the like. Such a tactile sensor as shown above is applicable not only for use as a cutaneous sensor for robots, but also for uses as instrument probes for measuring the configuration of a surface of an article having a large area (in particular, having a curved-surface configuration) by bringing a film-like elastic body into contact with the article surface, pointing devices for computer input, tablets, and input and output devices for implementation of virtual reality. Also, the three-dimensional structure can also be provided as a temperature sensor or an acceleration sensor in which micro three-dimensional structure elements having the movable structure are made to function as structure elements for detecting temperature or acceleration. Further, a temperature compensating sensor can also be implemented by integrally making up a sensor in which micro three-dimensional structure elements having a temperature detection function and micro three-dimensional structure elements having other functions are compositely provided and arranged within a film-like elastic body.

Here is explained an example based on a simulation in which such a tactile sensor 1 as shown above is applied as a cutaneous sensor placed on the surface of a robot hand.

First, in the simulation, resistance changes in the piezoresistive layer 14 with respect to displacements of the movable portion 2a of the cantilever 2 were measured by the manufactured tactile sensor 1. With a shearing force of 2.5 kPa weighted, a displacement $\Delta L$ is expressed by the following equation:

$$\Delta L = L \times \tau / E$$
$$= 500\,\mu m \times 2.5\ kPa / 800\ kPa$$
$$= 1.5\,\mu m$$

where L is the length of the cantilever.

The resulting resistance change in this case is about 10Ω. Assuming that the measurement is limited to the 1Ω order due to an effect of noise or the like in the resistance value detection, a theoretical lower-limit value of displacement detection determined by a resistance change is $\Delta L=0.15\,\mu m$. It is noted that improvement in resistance detection accuracy makes it possible to measure even lower displacements.

Here is assumed, as an example, a case where a 1-liter PET-bottle is grasped by a robot hand via a cutaneous sensor. Grasping the 1-liter PET-bottle by hand necessitates a shearing force of $(1\ kg \times 9.8\ m/s^2)/98\ cm^2=1\ kPa$ (where the area of the palm is set to be 7 cm×14 cm). A distribution of displacements with this shearing force weighted was calculated by simulation. As a result, it was determined that displacements equal to or higher than the detection lower-limit value of displacement occur in a region within a distance of 0.7 cm from the weighting point.

From the above simulation result, it can be found that the detectability (sensitivity) of the cantilevers 2 is 0.7 cm or less, so that arranging the cantilevers 2 within the film-like elastic body 3 at a pitch of 1.4 cm makes it possible to detect such a force as that for grasping a PET-bottle.

Also, in a calculation by a simulation based on the assumption that an object weighing 100g is grasped by a robot hand similarly, it can be understood that arranging the cantilevers 2 within the film-like elastic body 3 at a pitch of 0.4 cm or less allows shearing force by the object to be detected.

Although the arrangement interval (pitch) for the cantilevers can be determined by using a lower-limit value for displacement detection as shown above, yet it is preferable to determine the arrangement interval for the cantilevers in consideration of a thickness of the film-like elastic body and Young's modulus of a material from which the film-like elastic body is formed.

Although the structure of the terminal portion 4 in the cantilevers 2 has been briefly explained in the above description, a structure of the terminal portion for more reliable functioning of the cantilevers is now described below with reference to FIG. 20, which shows a schematic top view of a cantilever 92 according to a modification of the first embodiment, and FIG. 21, which is a sectional view of the cantilever 92 taken along the line D-D in FIG. 20.

Figure 20:
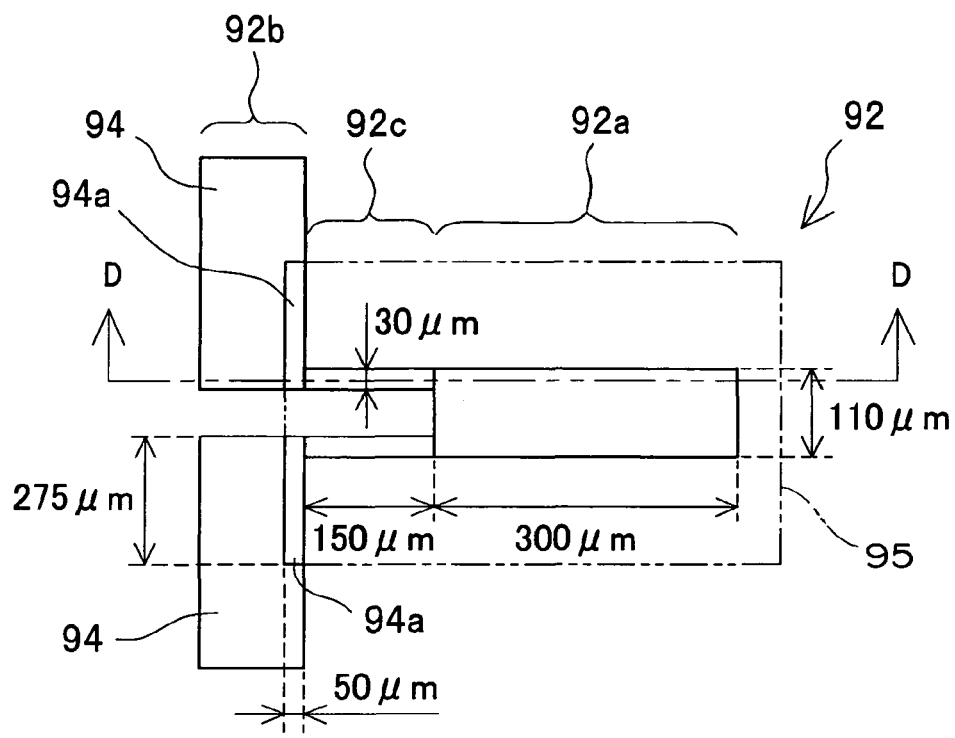
FIG. 20 is a schematic top view of a cantilever according to a modification of the first embodiment.
Figure 21:
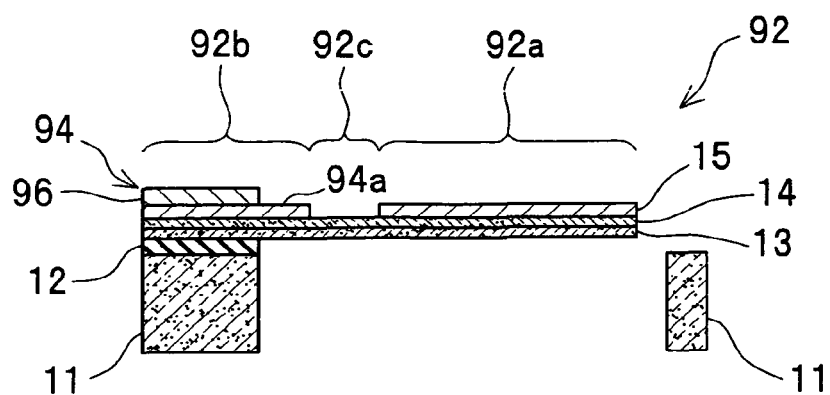
FIG. 21 is a schematic sectional view taken along the line D-D in the cantilever of FIG. 20.

First, as shown in FIGS. 20 and 21, the cantilever 92 includes a movable portion 92a, a fixation portion 92b, and a hinge portion 92c which is an example of a connecting portion that connects the movable portion 92a and the fixation portion 92b to each other so as to allow the movable portion 92a to operate. Also, the fixation portion 92b has a terminal portion 94 to which a wiring line is to be connected, and a plated Cu layer 96 is formed so as to cover the top face of the Cr/Ni layer 15 so that the terminal portion 94 functions as an electrode portion.

Such a plated Cu layer 96 is higher in rigidity than the other layers, while the hinge portion 92c having a deformation function is lower in rigidity. Accordingly, in the case of a structure in which the low-rigidity hinge portion 92c is connected directly to the high-rigidity fixation portion 92b, i.e. terminal portion 94, there occurs thermal deformation due to plasma in the PDMS 19 provided around the cantilevers during the process that the Si lower-layer 11 of the SOI wafer 10 is removed by DRIE etching process after the SOI wafer 10 with the cantilevers formed thereon is embedded into the PDMS 19. In some cases, stress may be added to the hinge portions of the cantilevers, so that the stress could concentrate at the connecting portion between the hinge portion and the terminal portion, resulting in damage of the connecting portion. In order to prevent occurrence of damage due to the stress concentration to the connecting portion, contrivances shown below are given to the cantilever 92.

As shown in FIGS. 20 and 21, at the terminal portion 94 of the cantilever 92, the plated Cu layer 96 is provided so as to cover the Cr/Ni layer 15. However, at portions of the terminal portion 94 corresponding to its connecting portion with the hinge portion 92c and its peripheries, the plated Cu layer 96 is not provided but a hinge connecting end portion 94a where the Cr/Ni layer 15 is exposed is formed. Such a hinge connecting end portion 94a is composed of the piezoresistive layer 14, the Si upper-layer 13 and the Cr/Ni layer 15 as viewed in the thicknesswise direction, its rigidity in the thicknesswise direction being set lower than that of the end portion 94 at portions where the plated Cu layer 96 is formed and higher than that of the hinge portion 92c. That is, the rigidity of the connecting portion of the hinge portion 92c to the end portion 94 is set so as to be middle between those of the two members. By such provision of the hinge connecting end portion 94a as shown above, the hinge connecting end portion 94a is allowed to move together with the hinge portion 92c to some extent upon action of external force on the cantilever 92 so that stress generated during the removal of the Si lower-layer 11 can be diffused. As shown in FIG. 20, the hinge connecting end portion 94a is formed, for example, into a two-dimensional size of 275 μm×50 μm for the hinge portion 92c having a two-dimensional size of 150 μm×30 μm. In FIG. 20, a portion represented by numeral 95 serves as an etching hole 95 which is a space that allows the movable portion 92a to be disconnected from the Si lower-layer 11 so as to be operable.

Figure 11:
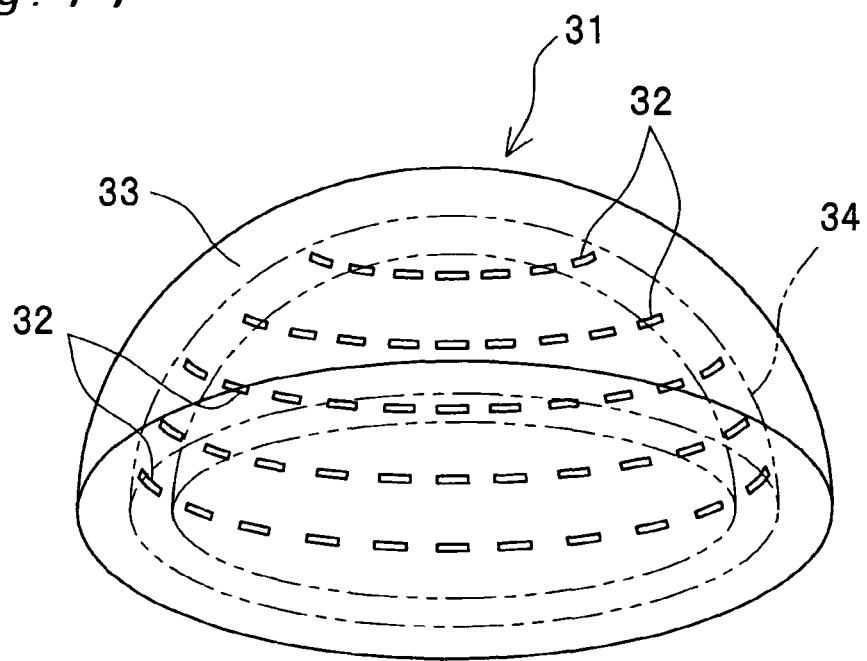
FIG. 11 is a schematic perspective view showing a three-dimensional structure set in a curved-surface configuration according to a modification of the first embodiment.

Also, the three-dimensional structure is not limited only to planar-shaped formations and, as shown in FIG. 11 as an example, may be formed or positioned in a curved-surface configuration. As shown in FIG. 11, sacrifice layers 34 are formed in a hemispherical shell shape, and a plurality of micro three-dimensional structure elements 32 are formed so as to be arrayed on an outer peripheral surface of the hemispherical shell. Then, by using the manufacturing method of the first embodiment or the like, a three-dimensional structure 31 can be formed in such a fashion that those micro three-dimensional structure elements 32 are arranged within a film-like elastic body 33 which is similarly formed into a hemispherical shell. Furthermore, the three-dimensional structure having a curved-surface configuration can be formed by using sacrifice layers having multifaceted-surface configuration. Such sacrifice layers having the multifaceted-surface configuration can be formed by combining a plurality of small planar-shaped sacrifice layers, on which the micro three-dimensional structure elements 32 are arranged, each other.

As an example, in the case where the micro three-dimensional structure elements 32 are formed as cantilevers and the three-dimensional structure 31 is made up as tactile sensor, a curved-surface arrangement in close contact with the surface of a robot hand or the like can be achieved. With an application to such a curved-surface arrangement, it becomes possible to more effectively obtain the working effects of the three-dimensional structure by virtue of the first embodiment, which adopts a technique of using a relatively hard layer such as the Si lower-layer 11 or the SiO$_2$ layer 12 as a sacrifice layer and finally removing the layer. In addition, for the film-like elastic body 3 formed from PDMS having a thickness of, for example, 1 mm, a minimum radius of winding object is about 1.1 mm, so that the film-like elastic body 3 has enough flexibility to make the arrangement in close contact with the surface of the robot hand or the like.

Figure 12:
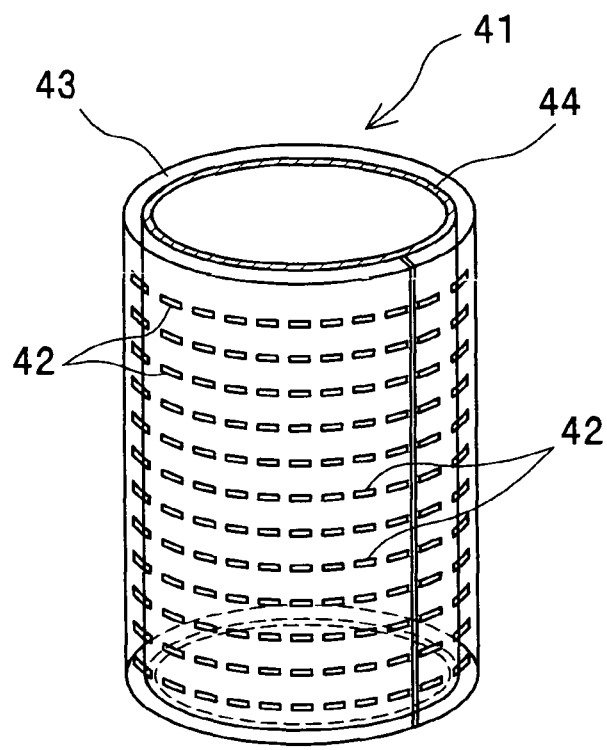
FIG. 12 is a schematic perspective view showing a three-dimensional structure with a base material placed therein according to another modification of the first embodiment.

Furthermore, as shown in FIG. 12, a base material such as so-called lining may be provided on a bottom surface of a three-dimensional structure 41 of a curved-surface arrangement for more reliability of the arrangement. Such a base material is preferably a flexible one formed from a material which is harder than a film-like elastic body 43 to have individual micro three-dimensional structure elements 42 arranged inside and which is softer than SOI wafer or the like.

Also, although not shown, it is also possible that a plurality of Z-axis direction cantilevers are arranged within an independent film-like elastic body to make up a pressure sensor while a plurality of X-axis direction cantilevers and Y-axis direction cantilevers are arranged within another film-like elastic body to make up a tactile sensor so that a sensor having a multilayer structure of those film-like elastic bodies is constituted. With a sensor formed in a multilayer structure like this, the cantilevers can be arranged in higher density, so that a higher-sensitivity sensor can be provided.

Next, with respect to such a tactile sensor as shown above, arrangement of wiring lines connected to the individual cantilevers or the like is described below.

As shown in the schematic sectional view of FIG. 6, a wiring line 5 for implementing input and output of electric signals is connected to the terminal portion 4 of each cantilever 2 in the tactile sensor 1. Meanwhile, such a wiring line 5 is placed so as to be finally embedded in the film-like elastic body 3 together with the cantilever 2. However, in a case where external force is applied to the film-like elastic body 3 for its elastic deformation, stress is added to the wiring line as well, there is a possibility of causing disconnections or connection failures or the like depending on the size of the stress or the like. Means for preventing such disconnections of wiring lines or the like is described below.

Figure 13:
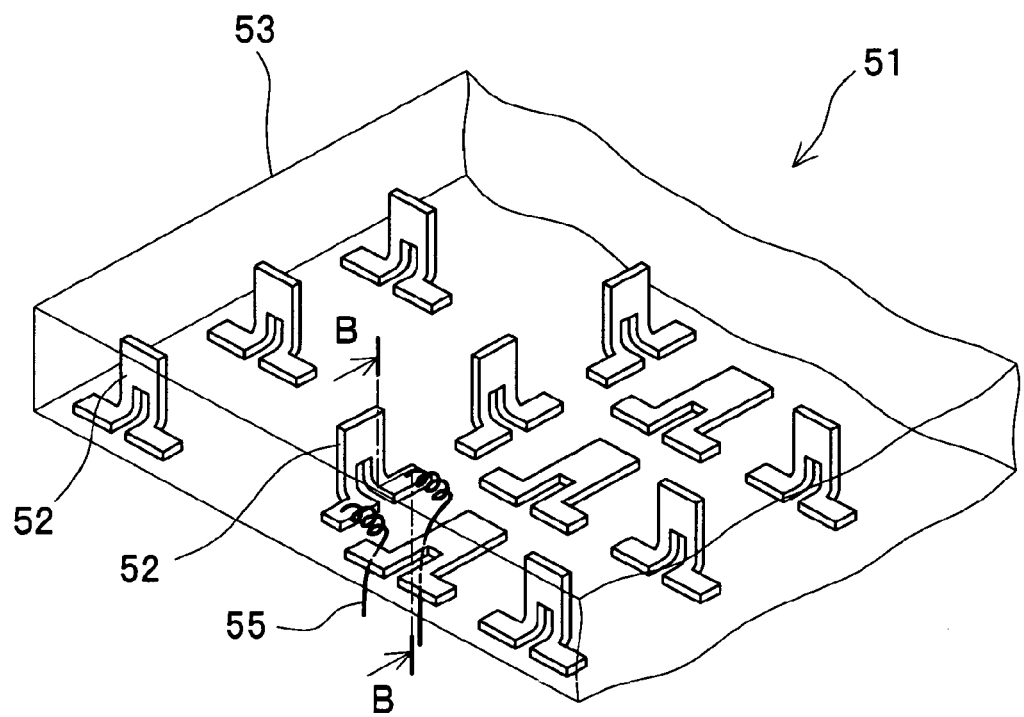
FIG. 13 is a schematic perspective view showing a cantilever wiring structure in a tactile sensor according to a modification of the first embodiment.

First, a schematic perspective view of a tactile sensor 51 according to a modification of the first embodiment is shown in FIG. 13. Also, a schematic sectional view taken along the line B-B of one cantilever 52 in the tactile sensor 51 of FIG. 13 is shown in FIG. 14.

Figure 14:
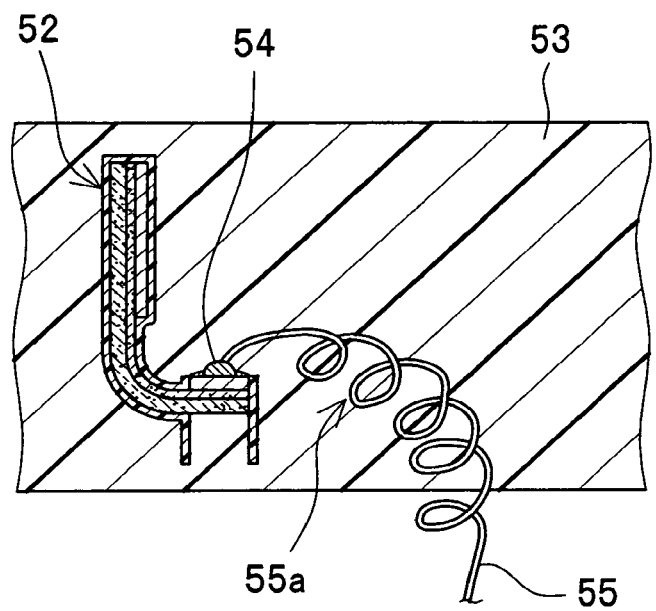
FIG. 14 is a schematic sectional view taken along the line B-B in the tactile sensor of FIG. 13.

As shown in FIGS. 13 and 14, a wiring line 55 is connected to a terminal portion 54 of the cantilever 52, and the wiring line 55 is embedded in a film-like elastic body 53 in a curved-line state, e.g., a spiral placement state. By such placement of the wiring line 55 as shown above, the spiral portion serves as a wiring slack portion 55a, thus allowing the wiring line 55 to be given a structural elasticity function. As a result, a stress applied to the wiring line 55 along with the elastic deformation of the film-like elastic body 53 can be elastically absorbed by the wiring slack portion 55a, so that occurrence of disconnections or the like can reliably be prevented. In addition, the configuration of such wiring lines, although illustrated in a linear shape (a wire shape) in the figure, may also be foil-shaped ones in which a wiring pattern is formed (drawn) on a thin film of copper or other conductors. More preferably, the terminal portion 54 is plated so as to be enhanced in strength.

Figure 15:
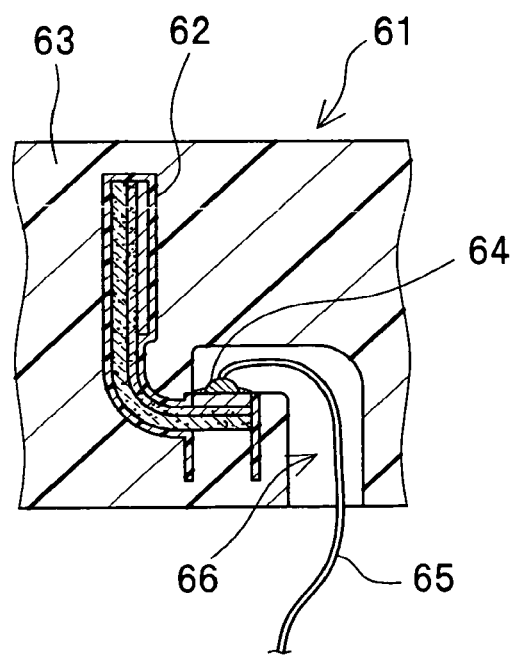
FIG. 15 is a schematic sectional view showing a cantilever wiring structure in a tactile sensor according to another modification of the first embodiment.

Another means for preventing disconnections is shown in a schematic sectional view of a cantilever 62 in a tactile sensor 61 according to another modification in FIG. 15. More specifically, in this means, as shown in FIG. 15, a wiring hollow portion 66 is provided within a film-like elastic body 63 so that a terminal portion 64 of the cantilever 62 and a wiring line 65 are prevented from making contact with the film-like elastic body 63, by which stress is kept from transferring from the film-like elastic body 63 to the wiring line 65. This means is reliably prevented from occurrence of disconnections.

Next, in such a tactile sensor as shown above, a means for ensuring integral operation of the movable portion and the film-like elastic body that is in contact with the movable portion in the cantilever embedded in the film-like elastic body, i.e., a means for preventing relative motion between the movable portion and its surrounding elastic body, is described below.

Figure 16:
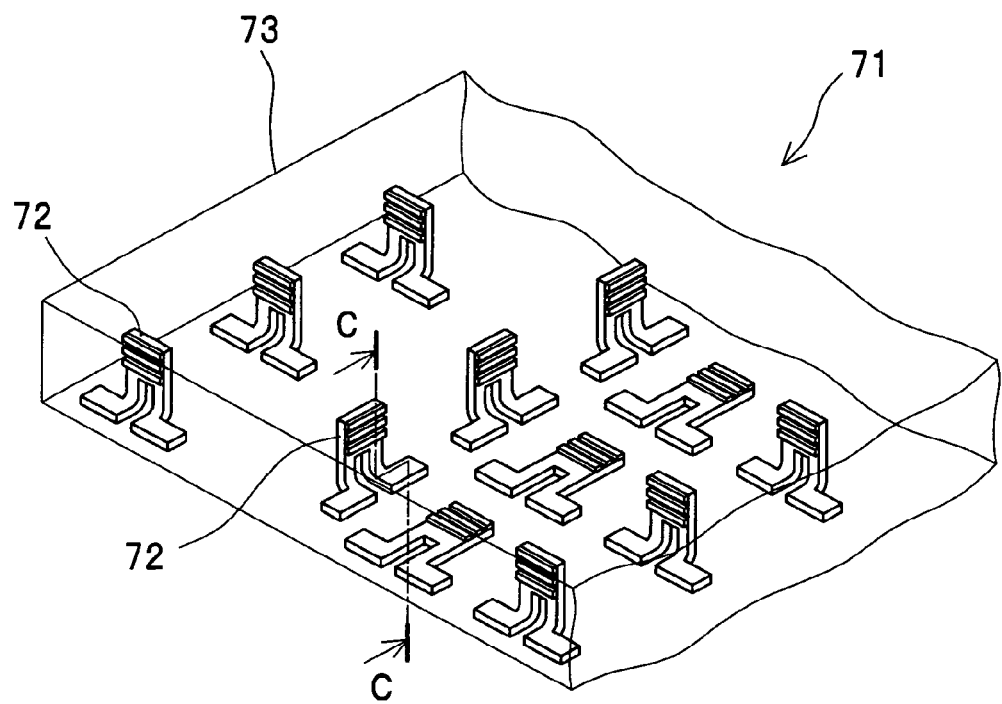
FIG. 16 is a schematic perspective view showing a relative motion prevention structure of the cantilevers in a tactile sensor according to a modification of the first embodiment.
Figure 17:
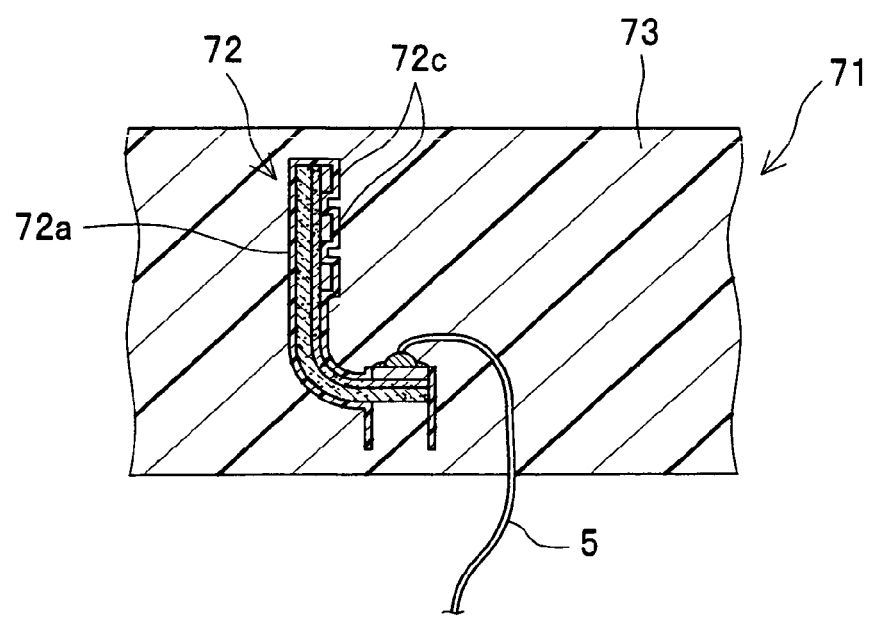
FIG. 17 is a schematic sectional view taken along the line C-C in the tactile sensor of FIG. 16.

As a tactile sensor according to a modification of the first embodiment, a tactile sensor 71 adopting a relative motion prevention means is shown as a schematic perspective view thereof is shown in FIG. 16, and a schematic sectional view of one cantilever 72 taken along the line C-C in the tactile sensor 71 of FIG. 16 is shown in FIG. 17.

As shown in FIGS. 16 and 17, a plurality of protruding portions 72c, which are an example of engaging portions, are provided on a surface of a movable portion 72a of the cantilever 72, where the protruding portions 72c are to be engaged with their surrounding film-like elastic body 73 so that the integrity between the movable portion 72a and its surrounding film-like elastic body 73 is further improved. In such a state, as the film-like elastic body 73 is elastically deformed, the elastic deformation can reliably be transferred to the movable portion 72a while relative motion of the movable portion 72a and its surrounding film-like elastic body 73 is reliably prevented. Thus, the function as the tactile sensor 71 can be further enhanced. In addition, such protruding portions 72c can also be said to be relative motion-preventing protruding portions (engaging portions) in terms of their function. Further, although FIG. 17 shows a case where the protruding portions 72c are provided only on one surface of the movable portion 72a of the cantilever 72, the protruding portions 72c may also be provided on the other surface or on both surfaces.

Figure 23:
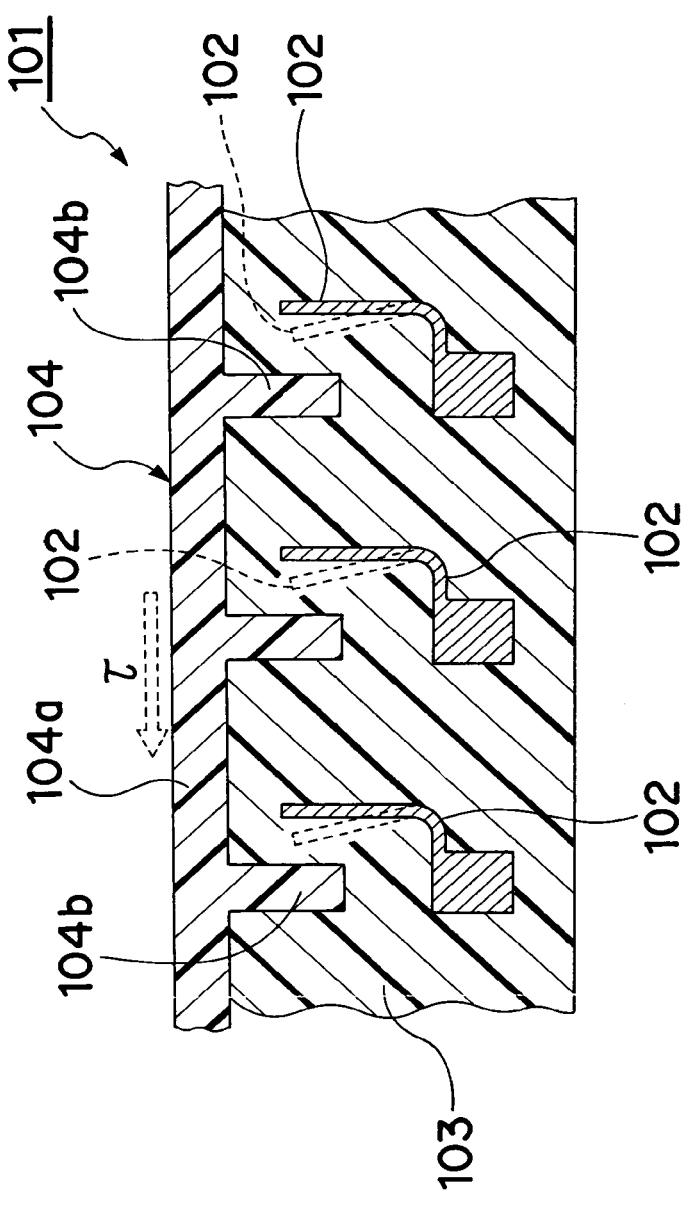
FIG. 23 is a schematic view showing a construction of a tactile sensor according to a modification of the first embodiment.

Furthermore, as shown in the schematic view of FIG. 23, it is also possible to adopt a construction that other members are arranged on the surface of a film-like elastic body 103. More specifically, in a tactile sensor 101 shown in FIG. 23, a stress concentration layer 104 is formed on the surface of the film-like elastic body 103 in which a plurality of cantilevers 102 are embedded.

As shown in FIG. 23, the stress concentration layer 104 is formed integrally from a surface layer portion 104a which covers a surface of the film-like elastic body 103, and a plurality of column portions 104b which is embedded protrusively inward of the film-like elastic body 103. Also, the stress concentration layer 104 is formed from an elastic material higher in rigidity than the film-like elastic body 103. The individual cantilevers 102 are so arranged that their movable portions are partly positioned between adjacently positioned column portions 104b, respectively.

By the provision of such a stress concentration layer 104, upon action of shearing stress on the surface of the tactile sensor 101, the shearing stress concentratedly acts on the stress concentration layer 104 formed from a material of relatively high rigidity, so that the individual column portions 104b and portions of the film-like elastic body 103 positioned therebetween are subjected to the action of the shearing stress. As a result, operation of the movable portions is facilitated in the individual cantilevers 102, so that the tactile sensor 101 can be improved in the sensitivity for detection of shearing stress.

According to the first embodiment, the tactile sensor 1 is manufactured by arranging, within the film-like elastic body 3, a plurality of cantilevers 2 formed on a relatively hard substrate such as the SOI wafer 10, and thereafter removing portions of the SOI wafer 10 that make no cantilevers 2 as a sacrifice layer. Therefore, in the tactile sensor 1, the individual cantilevers 2 can be set in a mutual independent arrangement state. Accordingly, upon action of external force on the film-like elastic body 3, partial shearing stress generated within the film-like elastic body 3 can reliably be transferred by operation and deformation of the movable portion 2a of a cantilever 2 placed at the portion, allowing an amount of the deformation to be reliably detected by the cantilever 2. In particular, since the substrate member 503 formed of Si or other relatively hard material, which would be present in the conventional tactile sensor 501, is not present in the tactile sensor 1 of the first embodiment, a tactile sensor of a curved-surface arrangement can be formed by using the flexibility function of the film-like elastic body 3. Further, the cantilevers 2 still can be manufactured with high accuracy of their arrangement and configuration and with high efficiency without any impairment, comparable to the conventional example. Thus, it becomes practicable to detect force and strain amounts with high accuracy and low cost, so that the application scope of the tactile sensor can be widened.

Second Embodiment

It is noted here that the present invention may be embodied in various modes without being limited to the foregoing embodiment. For instance, FIG. 18 is a schematic perspective view showing a tactile sensor 81 which is an example of a three-dimensional structure according to a second embodiment of the present invention.

Figure 18:
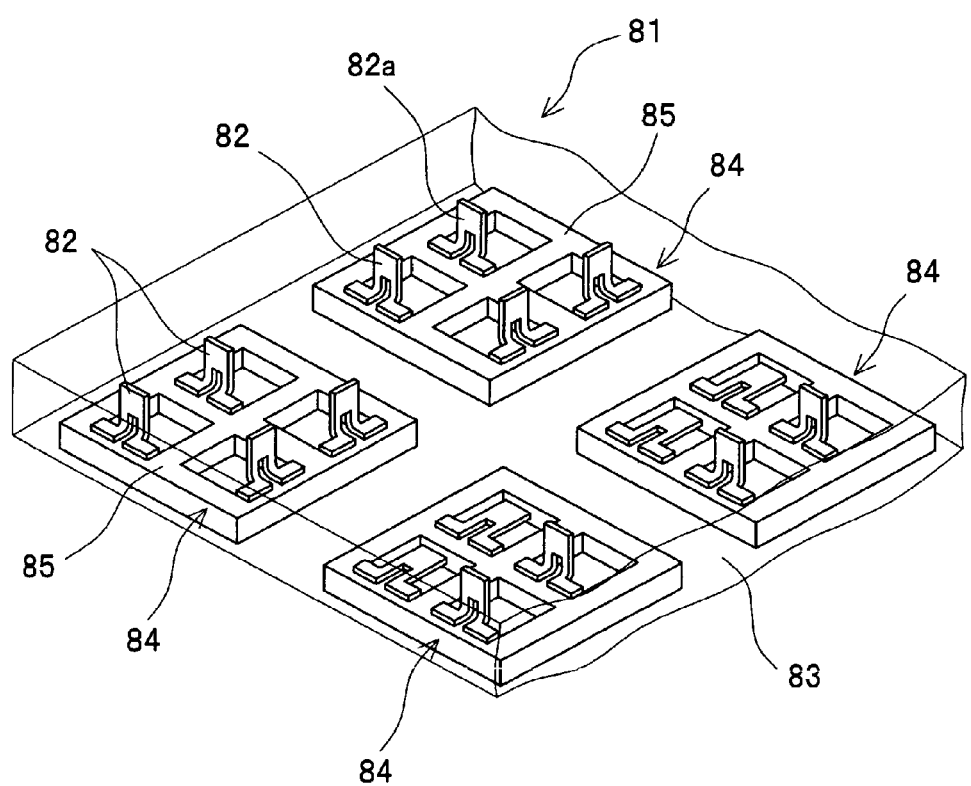
FIG. 18 is a schematic perspective view showing the construction of a tactile sensor according to a second embodiment of the invention.
Figure 19:
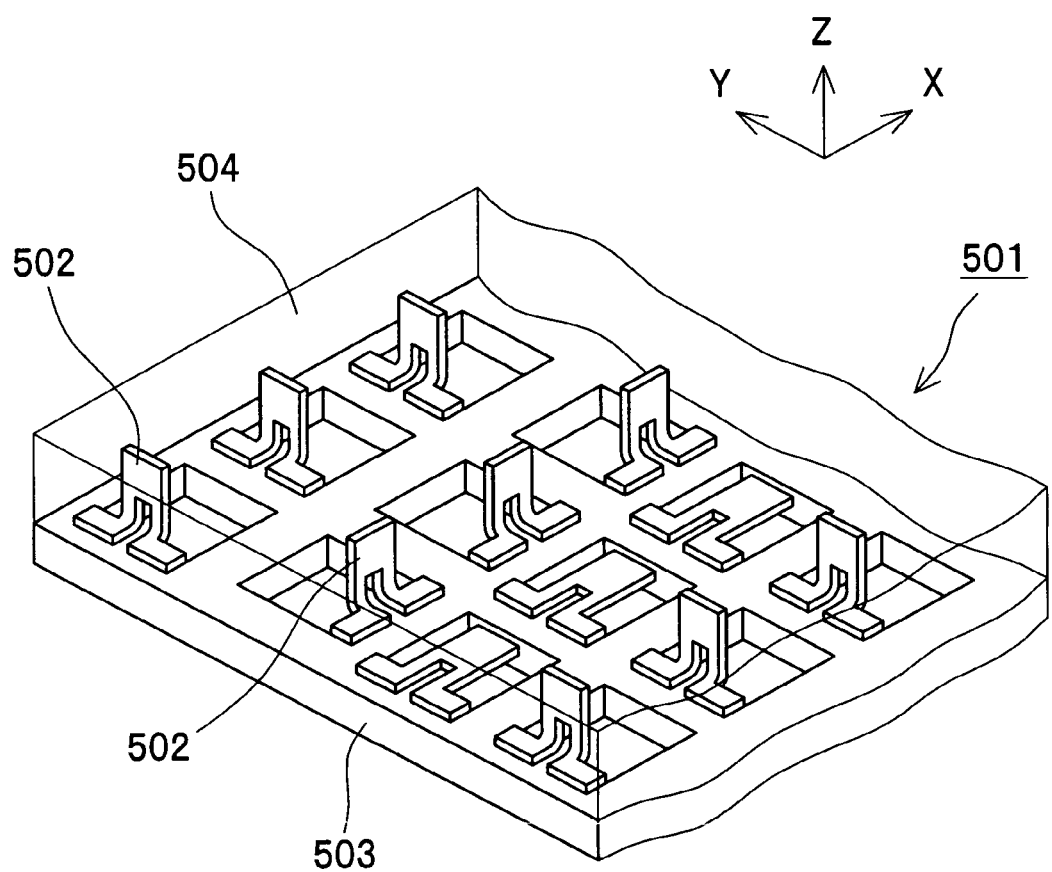
FIG. 19 is a schematic perspective view showing the construction of a conventional tactile sensor.

As shown in FIG. 18, the tactile sensor 81 of the second embodiment has a construction not that a plurality of micro three-dimensional structure elements typified by cantilevers as an example are arranged individual independently within the film-like elastic body, but that a plurality of micro three-dimensional structure element groups, in each of which a plurality of micro three-dimensional structure elements are connected to one another by a coupling member, are arranged individually and independently within a film-like elastic body. This second embodiment is similar in constitution to the first embodiment except that 'structure elements' are replaced with 'structure element groups' as shown above. Therefore, only this constitutional difference will be described below.

Concretely, as shown in FIG. 18, in the tactile sensor 81, four cantilevers 82 are fixed to a coupling member 85, which is a common member, by which a cantilever group 84, which is an example of the micro three-dimensional structure element group, is made up. Also, a plurality of such cantilever groups 84 are arranged and embedded independently of one another within a film-like elastic body 83.

Such a coupling member 85 as shown above is formed in such a size that the individual cantilevers 82 can be fixed thereto in an arrangement preventive against their mutual interference in their operations. The coupling member 85 is preferably formed as small as possible as far as it is capable of fixing the cantilevers 82 as shown above. Also, the coupling member 85 may be formed from Si or other like material, but it is preferably formed from resin material or metal material having elasticity. This is because forming the coupling member 85 smaller within a necessary limitation and from a material having elasticity makes it implementable to provide a more flexible tactile sensor 81 without impairing the elasticity of the film-like elastic body 83.

However, the coupling member 85 also has a role of securely coupling the cantilevers 82 of one group to ensure the movabilities of those cantilevers within the film-like elastic body 83. That is, the coupling member 85 has a role of maintaining a relative movability relation between mutually adjoining cantilevers 82 in the cantilever group 84 regardless of the elastic deformation of the film-like elastic body 83, in other words, a role of transferring shearing strain of the film-like elastic body 83 to a motion of a movable portion 82a of the cantilever with high efficiency. From this point of view, the coupling member 85 preferably has the highest possible rigidity.

As shown above, the coupling member 85 has to meet the requirements of having such elasticity as not to impair the elasticity of the film-like elastic body 83, as well as having high rigidity to improve the responsivity as a sensor. Therefore, the material for forming the coupling member 85 is preferably an elastic material having a modulus of elasticity higher than that of the elastic material for forming the film-like elastic body 83. It is noted that "a modulus of elasticity" is a ratio of stress to strain. Therefore, such a material having high rigidity also has high modulus of elasticity. Such a coupling member 85 is formed by, in the manufacturing process, subjecting part of the Si lower-layer to metal masking process in the step of etching (e.g., DRIE) of the Si lower-layer placed on the rear face to protect the masking-processed part from the etching effect.

By the provision of the coupling member 85 in the tactile sensor 81 as in this second embodiment, effects of the Z-axis direction pressure applied to X-axis and Y-axis direction cantilevers 82 can be reduced. Further, effects due to deformation of the film-like elastic body 83 can also be reduced by bendability of the tactile sensor 81 itself or the like.

Furthermore, such a tactile sensor 81 of this second embodiment as shown above as well as the tactile sensor 1 of the first embodiment can be changed for the place of their application depending on their respective characteristics. For example, in sensors for use in robots or the like, the tactile sensor 81 of the second embodiment in which the coupling member 85 is used can be applied to portions having a configuration of less curved surfaces and small curvatures such as the trunk portion and the arm portion or the like. Meanwhile, the tactile sensor 1 of the first embodiment, in which micro three-dimensional structures are placed singly or arranged with high density, can be applied to portions having a configuration of more curved surfaces and large curvatures such as finger tips or the like.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2006-012614 filed on Jan. 20, 2006, including specification, claims, drawings, and summary are incorporated herein by reference in its entirety.

What is claimed is:

1. A three-dimensional structure manufacturing method comprising:

arranging, into an elastic film, a plurality of micro three-dimensional structure elements each having a movable structure fixed on a sacrifice layer, and fixation portions of said plurality of micro three-dimensional structure elements fixed to said sacrifice layers;

removing said sacrifice layers so that said fixation portions of said micro three-dimensional structure elements are arranged independently of one another within said elastic film; and after the removal of the sacrifice layers, placing an elastic body, which is formed from the same material as that of said elastic film, at portions of said elastic film where said sacrifice layers have been removed.

2. The three-dimensional structure manufacturing method as defined in claim 1, wherein the arrangement of said individual micro three-dimensional structure elements into said elastic film is fulfilled by arranging a plurality of micro three-dimensional structure element groups, in each of which said plurality of micro three-dimensional structure elements are coupled to one another by a coupling member, and said individual fixation portions of said coupling members, at which said individual micro three-dimensional structure element groups are fixed to said sacrifice layers, into said elastic film, and then said sacrifice layers are removed, by which said individual fixation portions of said individual micro three-dimensional structure element groups are arranged independently of one another into said elastic film.

3. The three-dimensional structure manufacturing method as defined in claim 1, wherein said individual micro three-dimensional structure elements are arranged into said elastic film so that at least parts of said sacrifice layers are exposed from a surface of said elastic film.

4. The three-dimensional structure manufacturing method as defined in claim 1, wherein the arrangement of said individual micro three-dimensional structure elements into said elastic film is fulfilled by arranging, into said elastic film that is in a fluidizable state, said individual micro three-dimensional structure elements and said fixation portions to said sacrifice layers, and then curing the elastic body in the resulting arrangement state.

5. The three-dimensional structure manufacturing method as defined in claim 1, wherein said sacrifice layers are formed of Si or $SiO_2$.

6. The three-dimensional structure manufacturing method as defined in claim 1, wherein said individual micro three-dimensional structure elements formed on said sacrifice layer having a curved-surface configuration or a multifaceted-surface configuration are arranged into said elastic film having a curved-surface configuration or a multifaceted-surface configuration.

7. The three-dimensional structure manufacturing method as defined in claim 1, further comprising:

after the placement of the elastic body at the removal portions of the sacrifice layer, placing a flexible substrate formed from an elastic material on a surface of said elastic film on one side thereof on which said elastic body has been placed.

8. A three-dimensional structure manufacturing method comprising:

arranging, into an elastic film, a plurality of micro three-dimensional structure elements each having a movable structure fixed on a sacrifice layer, and fixation portions of said micro three-dimensional structure elements fixed to said sacrifice layers;

removing said sacrifice layers so that said fixation portions of said micro three-dimensional structure elements are arranged independently of one another within said elastic film; and after the removal of the sacrifice layers, placing a flexible substrate formed from an elastic material on a surface of said elastic film on one side on which said sacrifice layers have been removed.

9. The three-dimensional structure manufacturing method as defined in claim 8, wherein the arrangement of said individual micro three-dimensional structure elements into said elastic film is fulfilled by arranging a plurality of micro three-dimensional structure element groups, in each of which said plurality of micro three-dimensional structure elements are coupled to one another by a coupling member, and said individual fixation portions of said coupling members, at which said individual micro three-dimensional structure element groups are fixed to said sacrifice layers, into said elastic film, and then said sacrifice layers are removed, by which said individual fixation portions of said individual micro three-dimensional structure element groups are arranged independently of one another into said elastic film.

10. The three-dimensional structure manufacturing method as defined in claim 8, wherein said individual micro three-dimensional structure elements are arranged into said elastic film so that at least parts of said sacrifice layers are exposed from a surface of said elastic film.

11. The three-dimensional structure manufacturing method as defined in claim 8, wherein the arrangement of said individual micro three-dimensional structure elements into said elastic film is fulfilled by arranging, into said elastic film that is in a fluidizable state, said individual micro three-dimensional structure elements and said fixation portions to said sacrifice layers, and then curing an elastic body in the resulting arrangement state.

12. The three-dimensional structure manufacturing method as defined in claim 8, wherein said sacrifice layers are formed of Si or SiO2.

13. The three-dimensional structure manufacturing method as defined in claim 8, wherein said individual micro three-dimensional structure elements formed on said sacrifice layer having a curved-surface configuration or a multifaceted-surface configuration are arranged into said elastic film having a curved-surface configuration or a multifaceted-surface configuration.

* * * * *

UNITED STATES PATENT AND TRADEMARK OFFICE
CERTIFICATE OF CORRECTION

PATENT NO. : 8,440,089 B2  
APPLICATION NO. : 12/889821  
DATED : May 14, 2013  
INVENTOR(S) : Isao Shimoyama Page 1 of 1

It is certified that error appears in the above-identified patent and that said Letters Patent is hereby corrected as shown below:

Title Page, Item (73) should read:

Assignees: National University Corporation, The University of Tokyo, Tokyo (JP)

Panasonic Corporation, Osaka (JP)

Signed and Sealed this
Fifteenth Day of October, 2013

Teresa Stanek Rea
*Deputy Director of the United States Patent and Trademark Office*